United States Patent
Anchan et al.

(10) Patent No.: US 8,774,169 B2
(45) Date of Patent: Jul. 8, 2014

(54) SUPPORTING A MULTIMEDIA APPLICATION BASED ON NETWORK ZONE RECOGNITION

(75) Inventors: KiranKumar Anchan, San Diego, CA (US); Bongyong Song, San Diego, CA (US); Beth A. Brewer, Canyon Lake, TX (US)

(73) Assignee: QUALCOMM Incorporated, San Diego, CA (US)

( * ) Notice: Subject to any disclaimer, the term of this patent is extended or adjusted under 35 U.S.C. 154(b) by 42 days.

(21) Appl. No.: 13/089,589

(22) Filed: Apr. 19, 2011

(65) Prior Publication Data

US 2012/0093145 A1   Apr. 19, 2012

Related U.S. Application Data

(63) Continuation of application No. 61/325,878, filed on Apr. 20, 2010.

(51) Int. Cl.
*H04W 24/00* (2009.01)
*H04W 48/08* (2009.01)
*H04W 48/18* (2009.01)
*H04W 28/24* (2009.01)
*H04W 80/10* (2009.01)

(52) U.S. Cl.
CPC ............. *H04W 48/08* (2013.01); *H04W 48/18* (2013.01); *H04W 28/24* (2013.01); *H04W 80/10* (2013.01)
USPC ...................................................... 370/352

(58) Field of Classification Search
CPC .................................................. H04W 48/08
USPC .................. 370/338, 352; 455/411, 428, 410; 710/14
See application file for complete search history.

(56) References Cited

U.S. PATENT DOCUMENTS

| 2003/0119481 | A1* | 6/2003 | Haverinen et al. | ............ 455/411 |
| 2006/0062192 | A1* | 3/2006 | Payne, III | ...................... 370/338 |

(Continued)

FOREIGN PATENT DOCUMENTS

| CN | 101345916 A | * | 1/2009 | ............... H04B 7/26 |
| JP | 2006500808 A | | 1/2006 | |

(Continued)

OTHER PUBLICATIONS

International Search Report and Written Opinion—PCT/US2011/033213, ISA/EPO—Aug. 24, 2011.

*Primary Examiner* — Asad Nawaz
*Assistant Examiner* — Parth Patel
(74) *Attorney, Agent, or Firm* — Raphael Freiwirth

(57) ABSTRACT

In an embodiment, a user equipment (UE) determines that a current serving network is associated with a network support zone of a given type, wherein network support zones of different types are characterized by different levels of support for a multimedia client application configured to manage server-arbitrated communication sessions at the UE. The UE loads zone-specific network procedures for supporting the multimedia client application within the network support zone of the given type, and then executes the zone-specific network procedures at the UE. In another embodiment, an application server determines that the current serving network of the UE is associated with the network support zone of the given type. The application server selects zone-specific network parameters and/or features based on the determination, and then interacts with the multimedia client application within the network support zone of the given type with the selected zone-specific network parameters and/or features.

35 Claims, 14 Drawing Sheets

(56) References Cited

U.S. PATENT DOCUMENTS

| | | | |
|---|---|---|---|
| 2006/0268802 A1* | 11/2006 | Faccin | 370/338 |
| 2006/0282554 A1* | 12/2006 | Jiang et al. | 710/14 |
| 2007/0173251 A1* | 7/2007 | Vikberg et al. | 455/428 |
| 2008/0160958 A1* | 7/2008 | Abichandani et al. | 455/410 |
| 2010/0172347 A1* | 7/2010 | Zisimopoulos | 370/352 |

FOREIGN PATENT DOCUMENTS

| | | | |
|---|---|---|---|
| JP | 2008252308 A | 10/2008 | |
| WO | WO 03/039185 A1 * | 5/2003 | ............ H04Q 7/38 |
| WO | WO03039185 A1 | 5/2003 | |
| WO | 2004028095 A1 | 4/2004 | |

\* cited by examiner

Exemplary Network Service Zones

SUPPORTING A MULTIMEDIA APPLICATION BASED ON NETWORK ZONE RECOGNITION

CLAIM OF PRIORITY UNDER 35 U.S.C. §119

The present Application for Patent claims priority to Provisional Application No. 61/325,878 entitled "SUPPORTING A MULTIMEDIA APPLICATION BASED ON NETWORK ZONE RECOGNITION", filed Apr. 20, 2010 by the inventors hereof, and assigned to the assignee hereof and hereby expressly incorporated by reference herein.

BACKGROUND OF THE INVENTION

1. Field of the Invention

Embodiments of the invention relate to supporting a multimedia application based on network zone recognition.

2. Description of the Related Art

Wireless communication systems have developed through various generations, including a first-generation analog wireless phone service (1G), a second-generation (2G) digital wireless phone service (including interim 2.5G and 2.75G networks) and a third-generation (3G) high speed data/Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (W-CDMA), CDMA2000 (such as CDMA2000 1xEV-DO standards, for example) or TD-SCDMA.

In W-CDMA wireless communication systems, user equipments (UEs) receive signals from fixed position Node Bs (also referred to as cell sites or cells) that support communication links or service within particular geographic regions adjacent to or surrounding the base stations. Node Bs provide entry points to an access network (AN)/radio access network (RAN), which is generally a packet data network using standard Internet Engineering Task Force (IETF) based protocols that support methods for differentiating traffic based on Quality of Service (QoS) requirements. Therefore, the Node Bs generally interact with UEs through an over the air interface and with the RAN through Internet Protocol (IP) network data packets.

In wireless telecommunication systems, Push-to-talk (PTT) capabilities are becoming popular with service sectors and consumers. PTT can support a "dispatch" voice service that operates over standard commercial wireless infrastructures, such as W-CDMA, CDMA, FDMA, TDMA, GSM, etc. In a dispatch model, communication between endpoints (e.g., UEs) occurs within virtual groups, wherein the voice of one "talker" is transmitted to one or more "listeners." A single instance of this type of communication is commonly referred to as a dispatch call, or simply a PTT call. A PTT call is an instantiation of a group, which defines the characteristics of a call. A group in essence is defined by a member list and associated information, such as group name or group identification.

SUMMARY

In an embodiment, a user equipment (UE) determines that a current serving network of the UE is associated with a network support zone of a given type, wherein network support zones of different types are characterized by different levels of support for a multimedia client application configured to manage server-arbitrated communication sessions at the UE. The UE loads a set of zone-specific network procedures for supporting the multimedia client application within the network support zone of the given type, and then executes the set of zone-specific network procedures at the UE. In another embodiment, an application server determines that the current serving network of the UE is associated with the network support zone of the given type. The application server selects a set of zone-specific network parameters and/or features based on the determination, and then interacts with the multimedia client application within the network support zone of the given type with the selected set of zone-specific network parameters and/or features.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
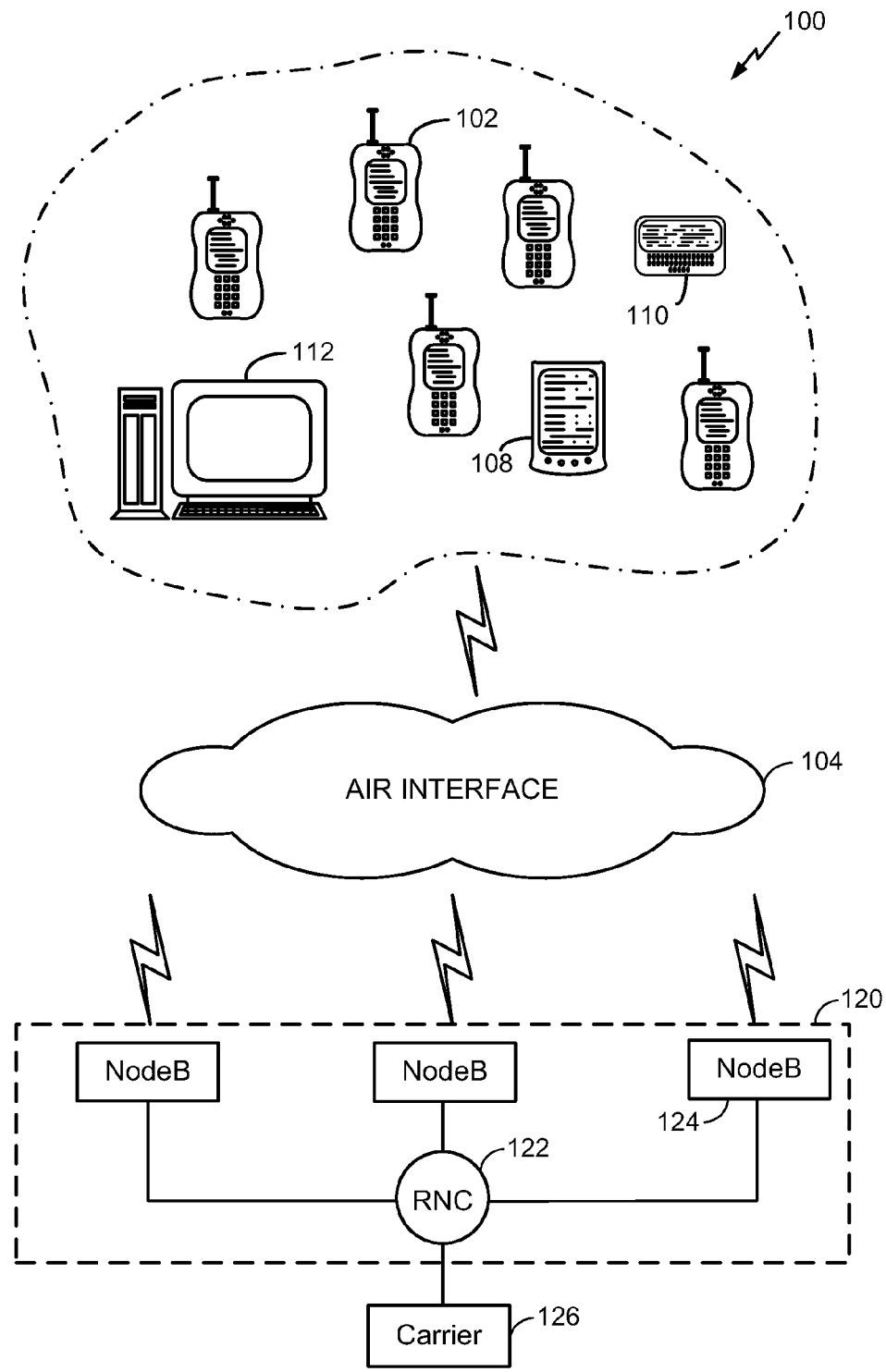
FIG. 1 is a diagram of a wireless network architecture that supports access terminals and access networks in accordance with at least one embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as user equipment (UE), may be mobile or stationary, and may communicate with one or more access points (APs), which may be referred to as Node Bs. A UE transmits and receives data packets through one or more of the Node Bs to a Radio Network Controller (RNC). The Node Bs and RNC are parts of a network called a radio access network (RAN). A radio access network can transport voice and data packets between multiple access terminals.

The radio access network may be further connected to additional networks outside the radio access network, such core network including specific carrier related servers and devices and connectivity to other networks such as a corporate intranet, the Internet, public switched telephone network (PSTN), a Serving General Packet Radio Services (GPRS) Support Node (SGSN), a Gateway GPRS Support Node (GGSN), and may transport voice and data packets between each UE and such networks. A UE that has established an active traffic channel connection with one or more Node Bs may be referred to as an active UE, and can be referred to as being in a traffic state. A UE that is in the process of establishing an active traffic channel (TCH) connection with one or more Node Bs can be referred to as being in a connection setup state. A UE may be any data device that communicates through a wireless channel or through a wired channel. A UE may further be any of a number of types of devices including but not limited to PC card, compact flash device, external or internal modem, or wireless or wireline phone. The communication link through which the UE sends signals to the Node B(s) is called an uplink channel (e.g., a reverse traffic channel, a control channel, an access channel, etc.). The communication link through which Node B(s) send signals to a UE is called a downlink channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a block diagram of one exemplary embodiment of a wireless communications system 100 in accordance with at least one embodiment of the invention. System 100 can contain UEs, such as cellular telephone 102, in communication across an air interface 104 with an access network or radio access network (RAN) 120 that can connect the access terminal 102 to network equipment providing data connectivity between a packet switched data network (e.g., an intranet, the Internet, and/or core network 126) and the UEs 102, 108, 110, 112. As shown here, the UE can be a cellular telephone 102, a personal digital assistant 108, a pager 110, which is shown here as a two-way text pager, or even a separate computer platform 112 that has a wireless communication portal. Embodiments of the invention can thus be realized on any form of access terminal including a wireless communication portal or having wireless communication capabilities, including without limitation, wireless modems, PCMCIA cards, personal computers, telephones, or any combination or sub-combination thereof. Further, as used herein, the term "UE" in other communication protocols (i.e., other than W-CDMA) may be referred to interchangeably as an "access terminal", "AT", "wireless device", "client device", "mobile terminal", "mobile station" and variations thereof.

Referring back to FIG. 1, the components of the wireless communications system 100 and interrelation of the elements of the exemplary embodiments of the invention are not limited to the configuration illustrated. System 100 is merely exemplary and can include any system that allows remote UEs, such as wireless client computing devices 102, 108, 110, 112 to communicate over-the-air between and among each other and/or between and among components connected via the air interface 104 and RAN 120, including, without limitation, core network 126, the Internet, PSTN, SGSN, GGSN and/or other remote servers.

The RAN 120 controls messages (typically sent as data packets) sent to a RNC 122. The RNC 122 is responsible for signaling, establishing, and tearing down bearer channels (i.e., data channels) between a Serving General Packet Radio Services (GPRS) Support Node (SGSN) and the UEs 102/108/110/112. If link layer encryption is enabled, the RNC 122 also encrypts the content before forwarding it over the air interface 104. The function of the RNC 122 is well-known in the art and will not be discussed further for the sake of brevity.

The core network 126 may communicate with the RNC 122 by a network, the Internet and/or a public switched telephone network (PSTN). Alternatively, the RNC 122 may connect directly to the Internet or external network. Typically, the network or Internet connection between the core network 126 and the RNC 122 transfers data, and the PSTN transfers voice information. The RNC 122 can be connected to multiple Node Bs 124. In a similar manner to the core network 126, the RNC 122 is typically connected to the Node Bs 124 by a network, the Internet and/or PSTN for data transfer and/or voice information. The Node Bs 124 can broadcast data messages wirelessly to the UEs, such as cellular telephone 102. The Node Bs 124, RNC 122 and other components may form the RAN 120, as is known in the art. However, alternate configurations may also be used and the invention is not limited to the configuration illustrated. For example, in another embodiment the functionality of the RNC 122 and one or more of the Node Bs 124 may be collapsed into a single "hybrid" module having the functionality of both the RNC 122 and the Node B(s) 124.

Figure 2A:
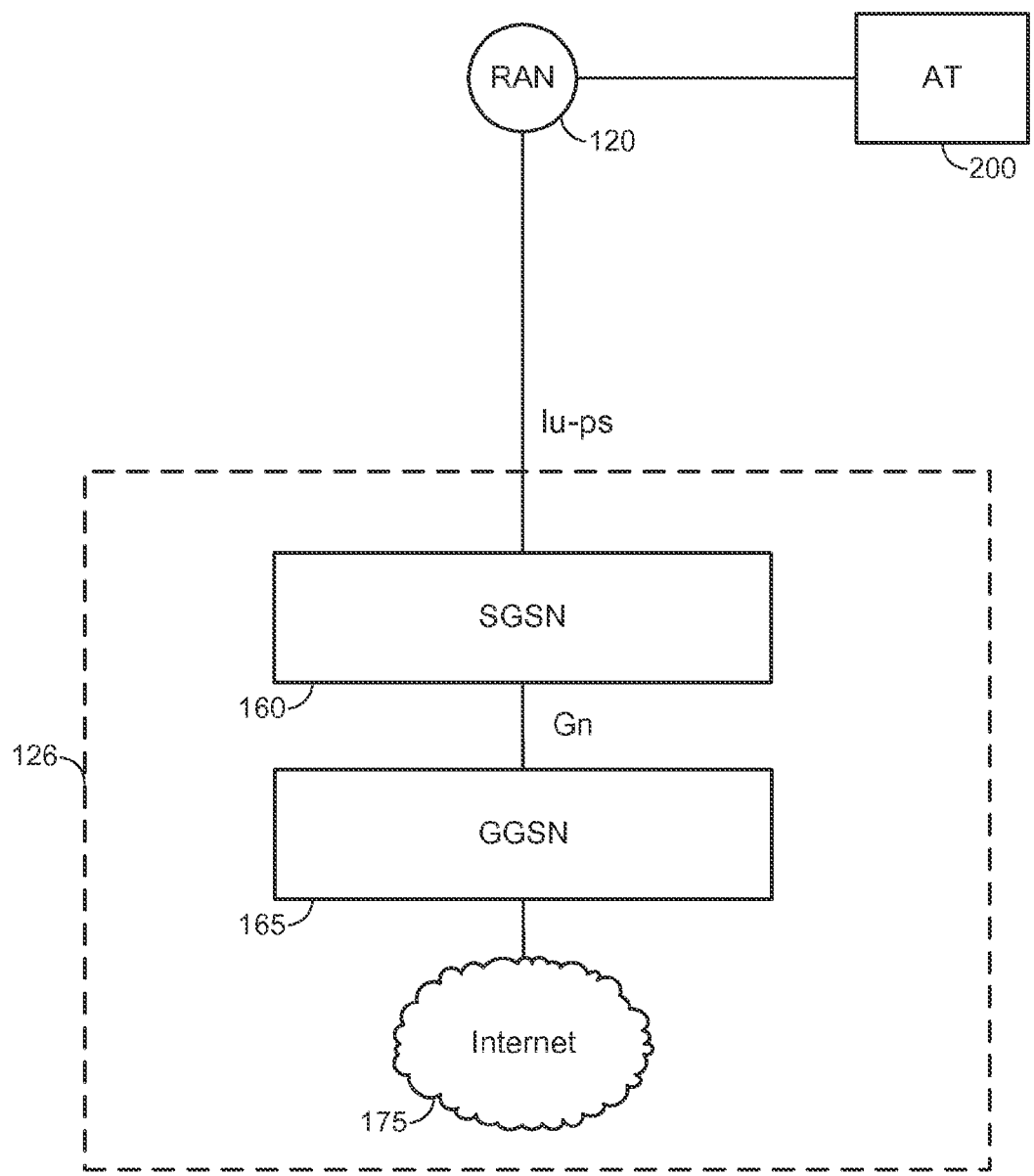
FIG. 2A illustrates the core network of FIG. 1 according to an embodiment of the present invention.

FIG. 2A illustrates the core network 126 according to an embodiment of the present invention. In particular, FIG. 2A illustrates components of a General Packet Radio Services (GPRS) core network implemented within a W-CDMA system. In the embodiment of FIG. 2A, the core network 126 includes a Serving GPRS Support Node (SGSN) 160, a Gateway GPRS Support Node (GGSN) 165 and an Internet 175. However, it is appreciated that portions of the Internet 175 and/or other components may be located outside the core network in alternative embodiments.

Generally, GPRS is a protocol used by Global System for Mobile communications (GSM) phones for transmitting Internet Protocol (IP) packets. The GPRS Core Network (e.g., the GGSN 165 and one or more SGSNs 160) is the centralized part of the GPRS system and also provides support for W-CDMA based 3G networks. The GPRS core network is an integrated part of the GSM core network, provides mobility management, session management and transport for IP packet services in GSM and W-CDMA networks.

The GPRS Tunneling Protocol (GTP) is the defining IP protocol of the GPRS core network. The GTP is the protocol which allows end users (e.g., access terminals) of a GSM or W-CDMA network to move from place to place while continuing to connect to the internet as if from one location at the GGSN 165. This is achieved transferring the subscriber's data from the subscriber's current SGSN 160 to the GGSN 165, which is handling the subscriber's session.

Three forms of GTP are used by the GPRS core network; namely, (i) GTP-U, (ii) GTP-C and (iii) GTP' (GTP Prime). GTP-U is used for transfer of user data in separated tunnels for each packet data protocol (PDP) context. GTP-C is used for control signaling (e.g., setup and deletion of PDP contexts, verification of GSN reach-ability, updates or modifications such as when a subscriber moves from one SGSN to another, etc.). GTP' is used for transfer of charging data from GSNs to a charging function.

Referring to FIG. 2A, the GGSN 165 acts as an interface between the GPRS backbone network (not shown) and the external packet data network 175. The GGSN 165 extracts the packet data with associated packet data protocol (PDP) format (e.g., IP or PPP) from the GPRS packets coming from the SGSN 160, and sends the packets out on a corresponding packet data network. In the other direction, the incoming data packets are directed by the GGSN 165 to the SGSN 160 which manages and controls the Radio Access Bearer (RAB) of the destination UE served by the RAN 120. Thereby, the GGSN 165 stores the current SGSN address of the target UE and his/her profile in its location register (e.g., within a PDP context). The GGSN is responsible for IP address assignment and is the default router for the connected UE. The GGSN also performs authentication and charging functions.

The SGSN 160 is representative of one of many SGSNs within the core network 126, in an example. Each SGSN is responsible for the delivery of data packets from and to the UEs within an associated geographical service area. The tasks of the SGSN 160 includes packet routing and transfer, mobility management (e.g., attach/detach and location management), logical link management, and authentication and charging functions. The location register of the SGSN stores location information (e.g., current cell, current VLR) and user profiles (e.g., IMSI, PDP address(es) used in the packet data network) of all GPRS users registered with the SGSN 160, for example, within one or more PDP contexts for each user or UE. Thus, SGSNs are responsible for (i) de-tunneling downlink GTP packets from the GGSN 165, (ii) uplink tunnel IP packets toward the GGSN 165, (iii) carrying out mobility management as UEs move between SGSN service areas and (iv) billing mobile subscribers. As will be appreciated by one of ordinary skill in the art, aside from (i)-(iv), SGSNs configured for GSM/EDGE networks have slightly different functionality as compared to SGSNs configured for W-CDMA networks.

The RAN 120 (e.g., or UTRAN, in Universal Mobile Telecommunications System (UMTS) system architecture) communicates with the SGSN 160 via a Iu interface, with a transmission protocol such as Frame Relay or IP. The SGSN 160 communicates with the GGSN 165 via a Gn interface, which is an IP-based interface between SGSN 160 and other SGSNs (not shown) and internal GGSNs, and uses the GTP protocol defined above (e.g., GTP-U, GTP-C, GTP', etc.). While not shown in FIG. 2A, the Gn interface is also used by the Domain Name System (DNS). The GGSN 165 is connected to a Public Data Network (PDN) (not shown), and in turn to the Internet 175, via a Gi interface with IP protocols either directly or through a Wireless Application Protocol (WAP) gateway.

The PDP context is a data structure present on both the SGSN 160 and the GGSN 165 which contains a particular UE's communication session information when the UE has an active GPRS session. When a UE wishes to initiate a GPRS communication session, the UE must first attach to the SGSN 160 and then activate a PDP context with the GGSN 165. This allocates a PDP context data structure in the SGSN 160 that the subscriber is currently visiting and the GGSN 165 serving the UE's access point.

Figure 2B:
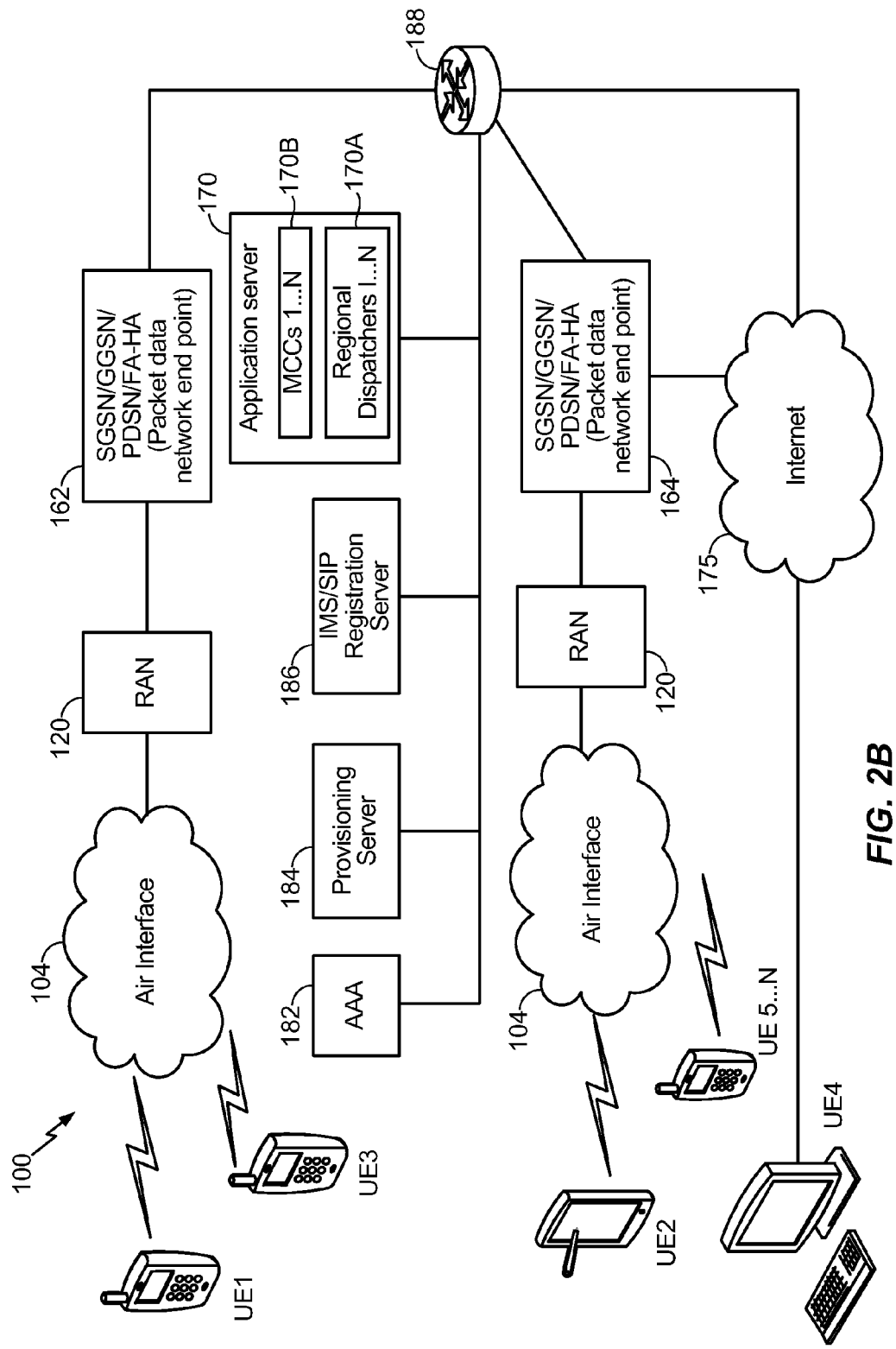
FIG. 2B illustrates an example of the wireless communications system of FIG. 1 in more detail.

FIG. 2B illustrates an example of the wireless communications system 100 of FIG. 1 in more detail. In particular, referring to FIG. 2B, UEs 1 . . . N are shown as connecting to the RAN 120 at locations serviced by different packet data network end-points. The illustration of FIG. 2B is specific to W-CDMA systems and terminology, although it will be appreciated how FIG. 2B could be modified to confirm with a 1x EV-DO system. Accordingly, UEs 1 and 3 connect to the RAN 120 at a portion served by a first packet data network end-point 162 (e.g., which may correspond to SGSN, GGSN, PDSN, a home agent (HA), a foreign agent (FA), etc.). The first packet data network end-point 162 in turn connects, via the routing unit 188, to the Internet 175 and/or to one or more of an authentication, authorization and accounting (AAA) server 182, a provisioning server 184, an Internet Protocol (IP) Multimedia Subsystem (IMS)/Session Initiation Protocol (SIP) Registration Server 186 and/or the application server 170. UEs 2 and 5 . . . N connect to the RAN 120 at a portion served by a second packet data network end-point 164

(e.g., which may correspond to SGSN, GGSN, PDSN, FA, HA, etc.). Similar to the first packet data network end-point 162, the second packet data network end-point 164 in turn connects, via the routing unit 188, to the Internet 175 and/or to one or more of the AAA server 182, a provisioning server 184, an IMS/SIP Registration Server 186 and/or the application server 170. UE 4 connects directly to the Internet 175, and through the Internet 175 can then connect to any of the system components described above.

Referring to FIG. 2B, UEs 1, 3 and 5 . . . N are illustrated as wireless cell-phones, UE 2 is illustrated as a wireless tablet-PC and UE 4 is illustrated as a wired desktop station. However, in other embodiments, it will be appreciated that the wireless communication system 100 can connect to any type of UE, and the examples illustrated in FIG. 2B are not intended to limit the types of UEs that may be implemented within the system. Also, while the AAA 182, the provisioning server 184, the IMS/SIP registration server 186 and the application server 170 are each illustrated as structurally separate servers, one or more of these servers may be consolidated in at least one embodiment of the invention.

Further, referring to FIG. 2B, the application server 170 is illustrated as including a plurality of media control complexes (MCCs) 1 . . . N 170B, and a plurality of regional dispatchers 1 . . . N 170A. Collectively, the regional dispatchers 170A and MCCs 170B are included within the application server 170, which in at least one embodiment can correspond to a distributed network of servers that collectively functions to arbitrate communication sessions (e.g., half-duplex group communication sessions via IP unicasting and/or IP multicasting protocols) within the wireless communication system 100. For example, because the communication sessions arbitrated by the application server 170 can theoretically take place between UEs located anywhere within the system 100, multiple regional dispatchers 170A and MCCs are distributed to reduce latency for the arbitrated communication sessions (e.g., so that a MCC in North America is not relaying media back-and-forth between session participants located in China). Thus, when reference is made to the application server 170, it will be appreciated that the associated functionality can be enforced by one or more of the regional dispatchers 170A and/or one or more of the MCCs 170B. The regional dispatchers 170A are generally responsible for any functionality related to establishing a communication session (e.g., handling signaling messages between the UEs, scheduling and/or sending announce messages, etc.), whereas the MCCs 170B are responsible for hosting the communication session for the duration of the call instance, including conducting an in-call signaling and an actual exchange of media during an arbitrated communication session.

Figure 3:
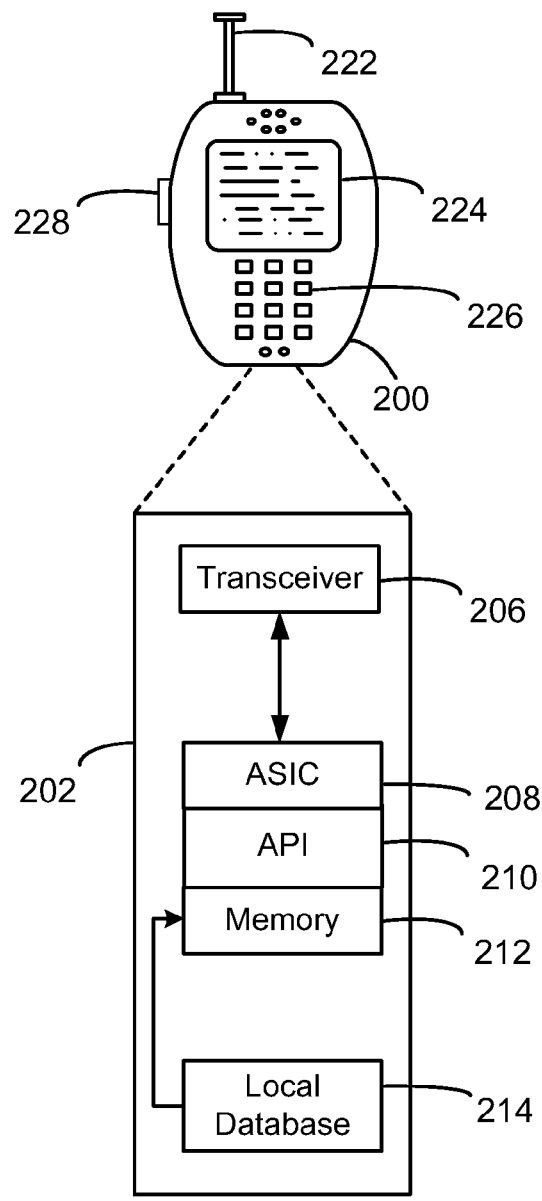
FIG. 3 is an illustration of an access terminal in accordance with at least one embodiment of the invention.

Referring to FIG. 3, a UE 200, (here a wireless device), such as a cellular telephone, has a platform 202 that can receive and execute software applications, data and/or commands transmitted from the RAN 120 that may ultimately come from the core network 126, the Internet and/or other remote servers and networks. The platform 202 can include a transceiver 206 operably coupled to an application specific integrated circuit ("ASIC" 208), or other processor, microprocessor, logic circuit, or other data processing device. The ASIC 208 or other processor executes the application programming interface ("API") 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include a UE including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the UE 200 in FIG. 3 are to be considered merely illustrative and the invention is not limited to the illustrated features or arrangement.

The wireless communication between the UE 102 or 200 and the RAN 120 can be based on different technologies, such as code division multiple access (CDMA), W-CDMA, time division multiple access (TDMA), frequency division multiple access (FDMA), Orthogonal Frequency Division Multiplexing (OFDM), the Global System for Mobile Communications (GSM), or other protocols that may be used in a wireless communications network or a data communications network. For example, in W-CDMA, the data communication is typically between the client device 102, Node B(s) 124, and the RNC 122. The RNC 122 can be connected to multiple data networks such as the core network 126, PSTN, the Internet, a virtual private network, a SGSN, a GGSN and the like, thus allowing the UE 102 or 200 access to a broader communication network. As discussed in the foregoing and known in the art, voice transmission and/or data can be transmitted to the UEs from the RAN using a variety of networks and configurations. Accordingly, the illustrations provided herein are not intended to limit the embodiments of the invention and are merely to aid in the description of aspects of embodiments of the invention.

Multimedia and real time applications configured to handle server-arbitrated communication sessions (e.g., VoIP sessions, PTT sessions, data sharing sessions, etc.) on cellular networks typically deploy an 'always-on' packet data service or data session and use multiple links (for e.g., multiple PDP contexts in case of a UMTS system or multiple PPP sessions in case of CDMA systems) to enable mobile terminated (MT) signaling while the mobile is inactive and to improve performance. To achieve the always-on data service on cellular networks, multimedia applications employ keep alive mechanisms and/or other network-based mechanism (e.g., long dormancy timers, etc.) in order to provide reliable service and a good user experience. The network may further assist delay sensitive application with preferential Quality of Service (QoS) treatment.

These types of optimized or enhanced services on networks are typically available in the home network of the cellular application provider that provides such specialized services like PTT over packet switched network and VoIP like applications. The services are also typically available on affiliate networks, which are not true home networks but are configured to allocate resources to the UEs in a similar manner as in the home network. When the UEs roam to a roaming network (i.e., a non-home and non-affiliate network) and packet data roaming is allowed in the roaming network, the enhanced services (e.g., always-on data session, multiple PDPs, preferential QoS, etc.) may not be available to the roaming UEs.

Under such circumstances the network assumptions considered for supporting the multimedia application in the home network are no longer valid. For example, the multimedia application may be configured to function with the assumption that the always-on data session is available. Thus, if the always-on data session is not supported in the roaming network, the multimedia application may not receive any mobile terminated data when the mobile is idle and the multimedia application may not function properly. In another example, the multimedia application may be configured to function with the assumption that its packet transfer will be supported with expedited data forwarding treatment (e.g., reduced latency, etc.). Thus, if the multimedia application is not allocated the expedited data forwarding treatment in the roaming network, the performance of the multimedia application may diverge from expectations.

As will be appreciated, the network conditions in the roaming network are difficult for the UEs to predict (e.g., some roaming networks may provide full support for the multimedia application while others may not) and can potentially be disruptive to the multimedia application's operation. Also, the battery performance of the UE can degrade in roaming networks if the UE performs operations that are designed for the home and/or affiliate networks which are wasted in the roaming networks. Accordingly, in the roaming networks, the multimedia application will typically either fail to work or will work with compromised quality that can impact the user experience and/or battery life of the UE.

Figure 4A:
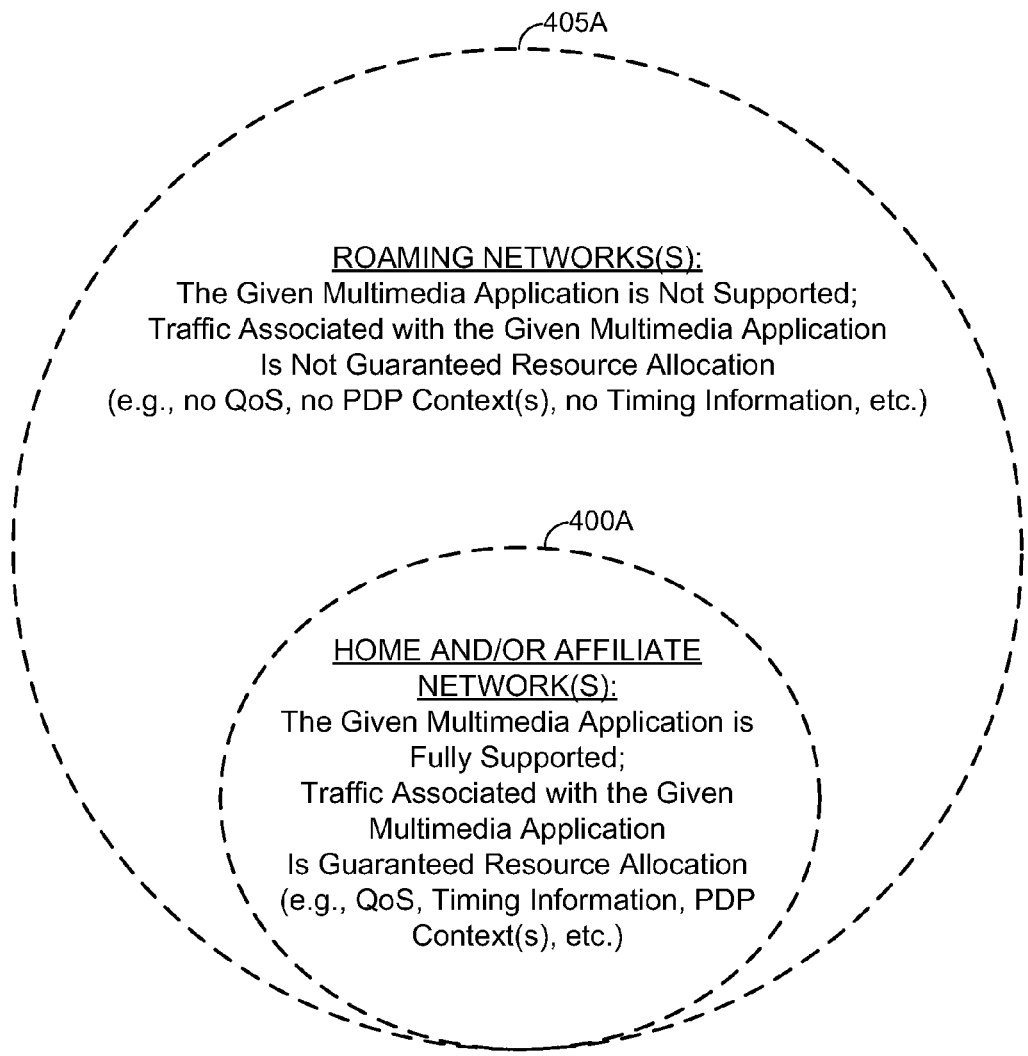
FIG. 4A illustrates a broad characterization of networks within a conventional wireless communication system with respect to a particular multimedia application.

FIG. 4A illustrates a broad characterization of networks within a conventional wireless communication system with respect to a particular multimedia application. Referring to FIG. 4A, a plurality of home and/or affiliate networks 400A are shown in relation to a plurality of roaming networks 405A. The home and/or affiliate networks 400A correspond to networks where the multimedia application is fully supported. For example, in the home and/or affiliate networks, the multimedia application may be allocated an always-on data session (e.g., with two always-on PDP contexts), the multimedia application is informed of the relevant timing information used by the multimedia application for timestamp-based authentication credential generation in a client-server model, the multimedia application is allocated a given amount of QoS resources, etc. On the other hand, the roaming networks 405A are not necessarily configured to fully support the multimedia application. Accordingly, the multimedia application has no guarantees with regard to QoS, the always-on data session and/or knowledge of the timing information in the roaming networks. Conventionally, despite the support restrictions in the roaming networks 405A, the multimedia application will attempt to execute support processes in the same manner irrespective of whether its UE is currently connected to one of the home and/or affiliate networks 400A or to one of the roaming networks 405A. However, the lack of the timing information will prevent the multimedia application from registering with the application server 170 if the authentication credentials are dependent on time and obtaining service. The multimedia application may also miss some provisioning updates with regards to the multimedia application due to the lack of the timing information.

Figure 4B:
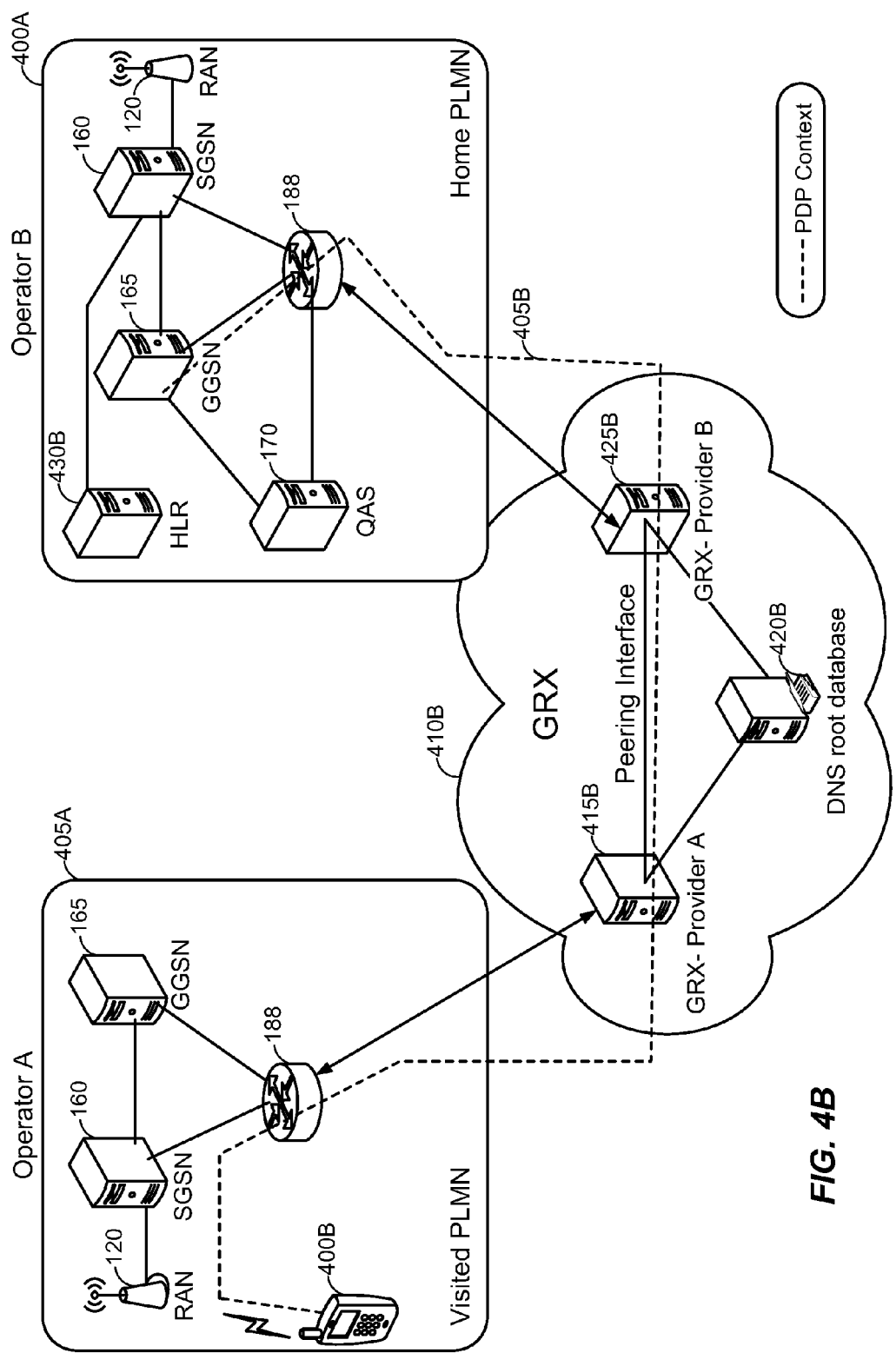
FIG. 4B illustrates the manner in which a given user equipment (UE) can send data from a roaming network or visited public land mobile network (PLMN) to an application server that is positioned at a home network or home PLMN using a packet data session that is terminated in the home network.

FIG. 4B illustrates the manner in which a given UE 400B can send data from a roaming network 405A or visited public land mobile network (PLMN) to the application server 170 that is positioned at a home network 400A or home PLMN. As shown in FIG. 4B, the given UE 400B has a PDP context established for routing data between the given UE 400B in the roaming network 405A and the application server 170 in the home network 400A.

For example, the given UE 400B can send data to the roaming RAN 120 which is forwarded to the roaming SGSN 160, the roaming routing unit 188 and then to a GRPS roaming exchange (GRX) network 410B. The GRX network 410B includes a GRX server 415B for the roaming network 405B (or Provider A), a Domain Name System (DNS) roots database 420B and a GRX server 425B for the home network 400A (or Provider B). In the GRX network 410B, data from the given UE 400B arrives at GRX server 415B and is forwarded over a peering interface to the GRX server 425B. The data is then forwarded from the GRX server 425B to the home routing unit 188, the home GGSN 165 and the application server 170 (or QAS). Also shown in the home network 400A is a home location register (HLR) 430B. As will be appreciated, a similar routing path can be implemented for data sent back to the given UE 400B from the application server 170.

Figure 4C:
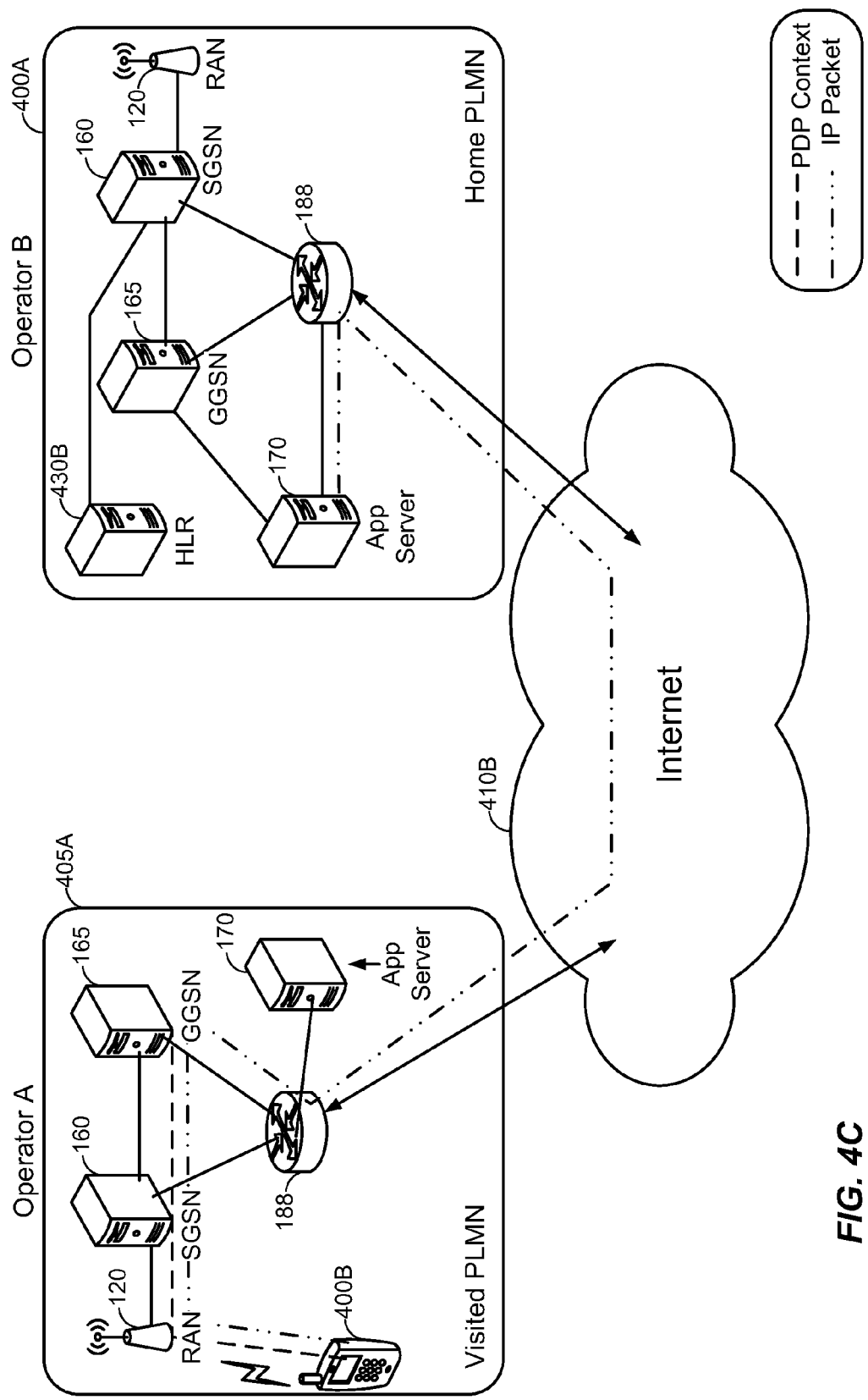
FIG. 4C illustrates another example in which a given UE can send data from a roaming network or visited PLMN to the application server that is positioned at the visited network or visited PLMN.

FIG. 4C illustrates another example in which a given UE 400B can send data from a roaming network 405A or visited PLMN to the application server 170 that is positioned at the visited network 405A or visited PLMN. In case of specific multimedia applications like PTT, VoIP etc, it is possible that the roaming scenario for an application server where the packet data session is terminated in the visited network 405A can be supported only when the application server 170 is located in the visited network 405A. This is because the routing from the visited network 405A to the application server 170 in the home network 400A may not be possible as a result of firewall restrictions or private IP addressing for some application server deployments. As shown in FIG. 4C, the given UE 400B has a PDP context terminated in the roaming network 405A for routing data between the given UE 400B in the roaming network 405A and the application server 170 in the home network 400A. For example, the given UE 400B can send data (e.g., an Internet Protocol (IP) packet) to the roaming RAN 120 which is forwarded to the roaming GGSN 165 via the SGSN 160. Since the PDP context is terminated at the roaming GGSN 165, the IP packet is then forwarded by conventional IP routing to the IP application server (or QAS) 170, located in the visited network 405A. As will be appreciated, a similar routing path can be implemented for data or IP packets sent back to the given UE 400B from the application server 170 in the visited network 405A.

Figure 4D:
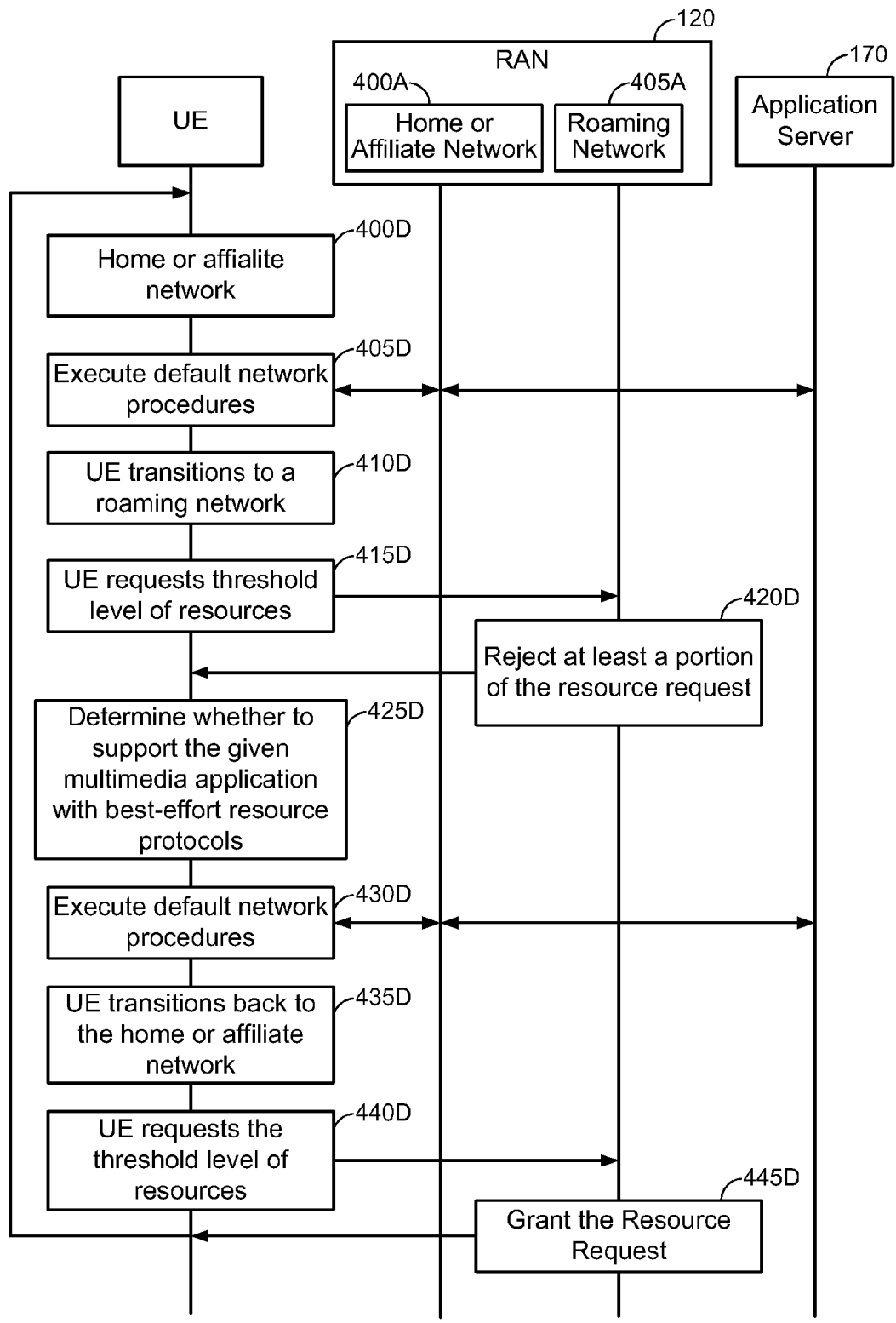
FIG. 4D illustrates a process of supporting a multimedia application of a given UE while the given UE transitions from a home or affiliate network to a roaming network.

FIG. 4D illustrates a process of supporting a multimedia application of a given UE while the given UE transitions from a home or affiliate network 400A to a roaming network 405A. Referring to FIG. 4D, in 400D, the given UE is connected to the home or affiliate network 400A and is allocated a threshold level of resources upon which server-arbitrated communication sessions are supported by the application server 170. For example, the given UE can be allocated a given level of QoS by the home or affiliate network 400A, and so on. While the given UE is connected to the home network in 400D, the given UE executes 'default' network procedures for supporting the multimedia application, 405D. In FIG. 4D, the network procedures are 'default' in the sense that the same network procedures are used irrespective of whether the given UE is currently connected to the home or affiliate network 400A, or to a roaming network 405A. In an example, the default network procedures performed in 405D may include sending a keep-alive packet at a default interval, etc.

Referring to FIG. 4D, in 410D, the given UE transitions from the home or affiliate network 400A to a roaming network 405A. The given UE requests the same threshold level of resources from the roaming network 405A for supporting the given multimedia application, 415D. However, because the roaming network 405A is not configured to fully support the given multimedia application, at least a portion of the resource request is rejected in 420D. For example, the resource request of 415D may correspond to a QoS reservation request that is rejected in 420D. Moreover some resources may be taken away from the network at a later stage without a notification to the UE (for e.g. PDP may be deactivated or PPP session may be released). Thus, while the resource denial is shown as occurring directly in response to the resource request in FIG. 4D, it will be appreciated that the resource denial can correspond to a resource withdrawal of previously allocated resources in other embodiments.

In 425D, because the given UE did not obtain its requested level of resources, the given UE determines whether to support the multimedia application with best-effort resource protocols while the given UE is being served by the roaming network 405A. Assuming that the given UE still attempts to provide some level of service for the multimedia application, the given UE executes the same default network procedures for supporting the multimedia application in 430D that were performed at 405D in the home or affiliate network 400A. As will be appreciated, certain of the default network procedures are performed based on an assumption that the current serving network is fully supporting the multimedia application. However, because the roaming network 405A does not fully support the multimedia application, these default network procedures are unnecessary or wasted.

In 435D, the given UE transitions back to the home or affiliate network 400A from the roaming network 405A. The given UE requests the same threshold level of resources from the home or affiliate network 400A for supporting the given multimedia application, 440D. Because the home network 400A is configured to fully support the given multimedia application, the resource request is granted in 445D. For example, the resource request of 440D may correspond to a QoS reservation request that is granted in 445D. The process then returns to 400D.

As will be appreciated by one of ordinary skill in the art, configuring the given UE's behavior related to supporting the multimedia application to operate in the same manner irrespective of whether the given UE is connected to a home or affiliate network or to a roaming network can lead to inefficiencies in the given UE's operation. Accordingly, embodiments of the invention are directed to configuring the given UE to determine a zone associated with a current serving network and to enforce zone-specific multimedia application-support operations based on the zone-determination.

Figure 5A:
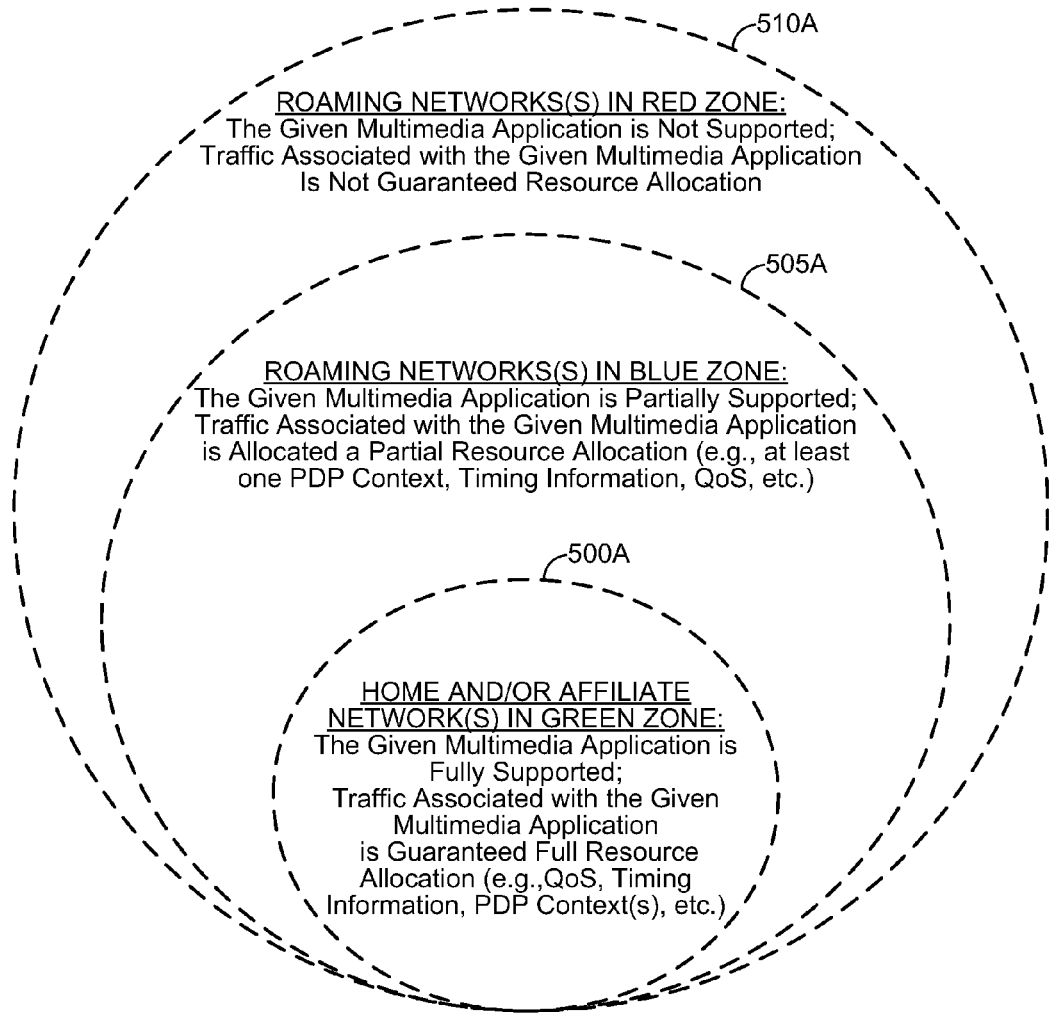
FIG. 5A illustrates a broad characterization of networks within a wireless communication system with respect to a particular multimedia application in accordance with an embodiment of the invention.

FIG. 5A illustrates a broad characterization of networks within a wireless communication system with respect to a particular multimedia application in accordance with an embodiment of the invention. Referring to FIG. 5A, the wireless communication system includes a green zone 500A, a blue zone 505A and a red zone 510A. Each of the zones 500A, 505A and 510A include at least one network (e.g., which can be identified via a PLMN ID, for instance) and each of the zones 500A, 505A and 510A is associated with a different expectation of support of the multimedia application.

The green zone 500A includes the home and/or affiliate networks, and green zone networks are configured to provide each of the enhanced operational features expected by the multimedia application, such as an always-on packet data session (e.g., two PDP contexts), a given level of QoS resources, expedited data forwarding, etc. The multimedia application or client that is configured for execution at the given UE is provisioned with green zone specific network procedures that leverage the full-support features expected to be available within the green zone in order to achieve the higher performance and a good user experience. As will be described in greater detail below, the given UE can determine whether it is within the green zone 500A based on a mapping of pre-provisioned network IDs to particular zones, or alternatively based on one or more dynamically measured performance parameters. Alternatively the application server 170 can assist the UE in the zone detection The blue zone 505A includes roaming networks that are expected to provide basic packet data service but are not expected to provide all of the enhanced support features of the green zone 500A. The multimedia application or client that is configured for execution at the given UE is provisioned with blue zone specific network procedures that leverage the partial-support features expected to be available within the blue zone in order to achieve an intermediate performance and an intermediate user experience. As will be described in greater detail below, the given UE can determine whether it is within the blue zone 505A based on a mapping of pre-provisioned network IDs to particular zones, or alternatively based on one or more dynamically measured performance parameters and/or assistance from the application server 170.

In an embodiment, networks that belong to the blue zone 505A may have the following requirements to blue zone compliance:
 i. Packet data roaming agreement between the roaming network and the home network for QoS or best-effort protocols (e.g., in the absence of QoS);
 ii. Multimedia application always finds DNS and application server's IP address (simple Service Discovery);
 iii. When always on PDP is not supported, multimedia application's registration refresh timer can be leveraged to maintain PDP (if relatively long PDP inactivity is applied);
 iv. Coordinated Universal Time (UTC) provided by the roaming network (for time based authentication of the multimedia application); and
 v. Based on determination by the UE, the multimedia application (or client) on the UE can request the application server 170 (QAS) to assist the UE in setting up dedicated channels.

The red zone 510A includes roaming networks that are expected to provide basic packet data service but are not expected to provide any of the enhanced support features of the green zone 500A or blue zone 505A. For example, red zone networks may not have a roaming agreement with an operator of the home network or the home network operator can deliberately block service to the red zone network. In the red zone, the multimedia application or client refrains from performing any network procedures associated with supporting enhanced support features of the multimedia application, and can also refrain from requesting resources that are expected to be denied by the red zone network. As will be described in greater detail below, the given UE can determine whether it is within the red zone 510A based on a mapping of pre-provisioned network IDs to particular zones, or alternatively based on one or more dynamically measured performance parameters and/or based on application server assisted signaling. The reduced operation-level of the multimedia application within the red zone 510A reduces unnecessary messaging and also reduces battery drain of the given UE.

Figure 5B:
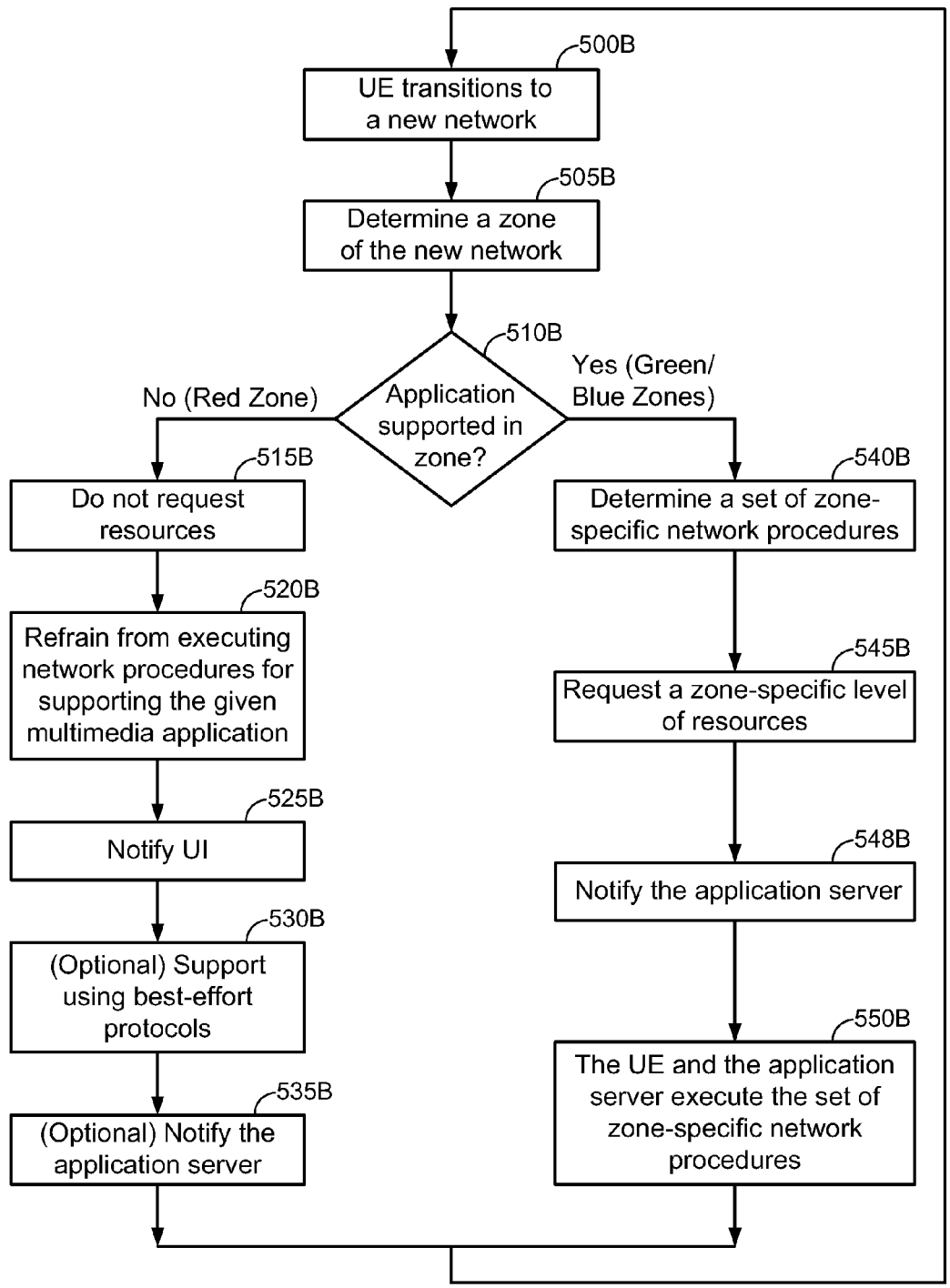
FIG. 5B illustrates a process of supporting the multimedia application at a given UE based on network-zone recognition in accordance with an embodiment of the invention.

FIG. 5B illustrates a process of supporting the multimedia application at a given UE based on network-zone recognition in accordance with an embodiment of the invention. Referring to FIG. 5B, the given UE determines that it has transitioned to a new network, 500B. For example, the determination of 500B can occur when the given UE powers up, or alternatively when the given UE hands off to the new network.

In 505B, the given UE determines a zone of the new network, where the zone is associated with a given resource-allocation expectation and a given set of application specific attributes like reliability timers, de jitter buffers, etc. for supporting the multimedia application. In particular, the given UE determines, in 505B, whether the new network can be classified as falling within the green zone 500A, the blue zone 505A or the red zone 510A. Also, while FIG. 5B is directed to a three-zone implementation, it will be appreciated that the number of zones can be increased when network scenarios require additional and/or different parameters on the UE given than the parameters covered or characterized by the three zones.

For example, in 505B, the given UE can be configured to dynamically determine the zone of the current network. In this example, the preferential QoS is requested (i.e., in which case 545B discussed below can be omitted) and the given UE sends data packets to the application server 170 to determine the round trip delay and the jitter. If the network denies or downgrades the QoS or if the delay and jitter values are above a given threshold set for green zone, the multimedia application determines that the current network is a blue zone network. If the QoS resource request were denied altogether, the current network would be considered a blue or a red zone network. Otherwise, the current network can be considered to be a green zone network. Moreover, during the initial registration with the application server 170, the UE can notify the application server 170 that the UE is getting service from a green or a blue zone. Thus the application server 170 can also apply zone specific procedures. Additional examples whereby the determination or classification of 505B is performed based on a network ID comparison (instead of a dynamic performance-evaluation as described above) will be described in greater detail below.

In 510B, based on the determination or classification of 505B, the given UE determines whether the new network is expected to provide any level of enhanced feature support for the multimedia application. If the given UE determines that the new network is not expected to provide any level of enhanced feature support for the multimedia application (for e.g., registration for VoIP or PTT service), such as when the new network is classified as a red zone network, the process advances to 515B.

In 515B, the given UE refrains from requesting resources (e.g., QoS, etc.) for supporting enhanced support features of the multimedia application, and the given UE also refrains from executing network procedures associated with enhanced support features of the multimedia application, 520B. For example, in 520B, the given UE can refrain from attempting service discovery procedures and/or registering with the application server 170 while in the red zone 510A.

The given UE also notifies a user thereof via a user interface (UI) that the enhanced support features will not be supported in the given UE's new network, 525B. Optionally (for e.g., based on user input), the given UE can attempt to support the multimedia application in the new network via best-effort protocols in the absence of guaranteed support for the enhanced features of the multimedia application, 530B. Also, the given UE can optionally notify the application server 170 that is configured to arbitrate communication sessions of the multimedia application with regard to the given UE's transition to the new network and/or with respect to the given UE's new zone, 535B. While not shown explicitly in FIG. 5B, the application server 170 can update the manner in which it supports the given UE based on the notification of 535B, such that certain features are reduced or disabled when the given UE is in the blue zone 505A or the red zone 510A. After 535B, the process returns to 500B and waits for the given UE to transition to a different network.

Referring to FIG. 5B, if the given UE determines that the new network is expected to provide a given level of enhanced feature support for the multimedia application, such as when the new network is classified as a green or blue zone network, the process advances to 540B. In 540B, the given UE determines a set of zone-specific network procedures for supporting the multimedia application within the net network based on the zone-determination. For example, if the new network is determined to be within the green zone 500A in 505B, the given UE determines green zone specific network procedures in 540B. Likewise, if the new network is determined to be within the blue zone 505A in 505B, the given UE determines blue zone specific network procedures in 540B.

The given UE also requests a zone-specific level of resources from the network and the application server 170 for supporting the multimedia application within the new network based on the zone-determination from 505B. For example, if the new network is determined to be within the green zone 500A in 505B, the given UE requests full-resources in 545B and the UE uses application level timers and de jitter buffers optimized for low latency performance. Otherwise, if the new network is determined to be within the blue zone 505A in 505B, the given UE requests partial-resources in 545B and notifies the application server to assist the UE in the enhancing the reliability and performance of the service using longer de jitter buffers for smoother audio payout. For example, the application server 170 can send, to the UE, dummy packet(s) with a data payload above an Event 4a threshold so as to trigger a transition of the UE by the RAN 120 to a dedicated-channel (DCH) state (e.g., E-DCH or DCH).

In 548B the given UE can notify the application server 170 with regard to its current zone and/or network. While not shown explicitly in FIG. 5B, the application server 170 can update the manner in which it supports the given UE based on the notification of 548B, such that certain features are reduced (conservative application layer reliability) or disabled when the given UE is in the blue zone 505A. Alternatively is the UE is in the green zone, the application layer service is optimized for low latency and higher performance. In 550B, the given UE and the application server 170 executes the set of zone-specific network procedures so long as the given UE remains within the new network and/or its current zone. While the network procedure is executing in 550B, the process returns to 500B and waits for the given UE to transition to a different network.

Figure 5C:
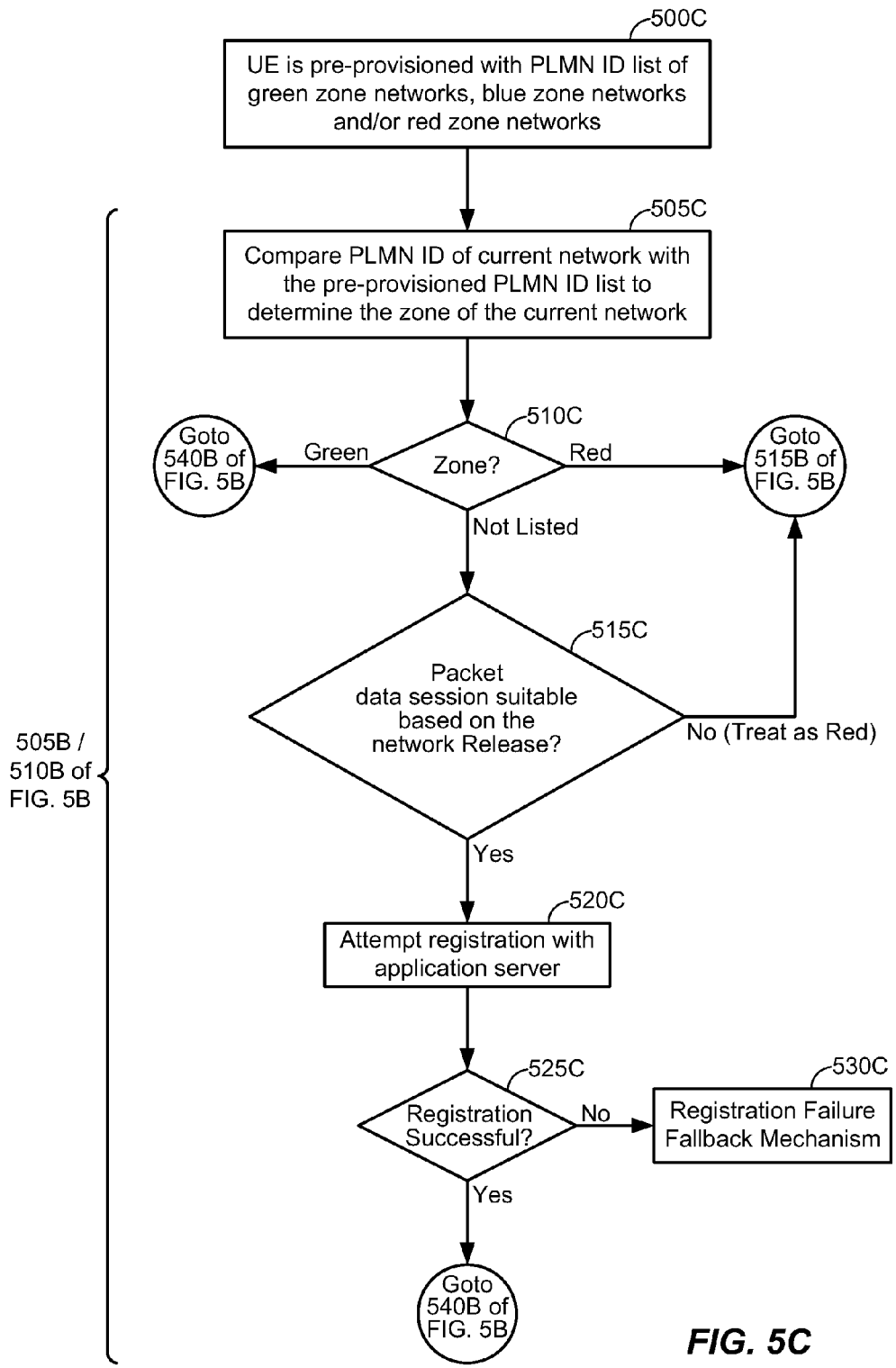
FIG. 5C illustrates a process by which the given UE can determine whether its new network corresponds to a green zone network, a blue zone network or a red zone network in accordance with an embodiment of the invention.

FIG. 5C illustrates a process by which the given UE can determine whether its new network corresponds to a green zone network, a blue zone network or a red zone network in accordance with an embodiment of the invention. Thus, FIG. 5C in part shows an example implementation of blocks 505B and 510B of FIG. 5B. In the example of FIG. 5C, a number of assumptions are made, as follows:

i. Red zone network PLMN IDs are either provisioned in the PLMN ID list, or else operator will omit the red zone network PLMN IDs so that the UE will determine the network zone based on the process of elimination based on the availability of requested resources and the access to application servers and timing information;

ii. Mechanism to detect red zone networks;
iii. Set parameters for affiliate networks in green zone (e.g., conservative de-jitter buffer size and reliability times) equal to the parameters of the home network in an example; and
iv. Time information for registrations (e.g., in the absence of UTC timing information, the multimedia application can attempt registration with local time).

Referring to FIG. 5C, assume that the given UE is pre-provisioned with a PLMN ID list of green zone networks, blue zone networks and/or red zone networks, 500C. Each listed network in the PLMN ID list is defined or mapped to the green zone 500A, the blue zone 505A or the red zone 510A. Also, the zone-associations of non-listed networks can be inferred from the zone-associations of the listed networks.

For example, the PLMN ID list can include a listing of green zone networks and blue zone networks, with any omitted networks assumed by the given UE to be red zone networks. In another example, the PLMN ID list can include a listing of green zone networks and red zone networks, with any omitted networks assumed by the given UE to be blue zone networks. In another example, the PLMN ID list can include a listing of blue zone networks and red zone networks, with any omitted networks assumed by the given UE to be green zone networks. In another example, the PLMN ID list can include a listing of green zone networks, red zone networks and blue zone networks, with no omitted networks (e.g., where any non-listed networks can be evaluated by their actual performance in an example). In another example, the PLMN ID list can include a listing of green zone networks, red zone networks and blue zone networks, with any omitted networks assumed by the given UE to be blue zone networks and the UE evaluates any non-listed networks by their actual performance and classifies them further as either the blue or the red network.

In an example, the pre-provisioning of 500C can occur at some point before the process of FIG. 5B is initiated. The remainder of FIG. 5C corresponds to an example implementation of blocks 505B and 510B of FIG. 5B.

Accordingly, in 505C, the given UE compares the PLMN ID of its current network with the PLMN ID list to determine the zone of the current network. As discussed above, the determination of 505C can be based either on the current network's PLMN ID being included in the PLMN ID list, or being omitted from the PLMN ID list. In 510C, based on the determination or classification of 505C, the given UE identifies the zone of the current network, 510C. In 510C, if the current network's zone is a green zone, the process advances to 540B of FIG. 5B. In 510C, if the current network's zone is a red zone, the process advances to 515B of FIG. 5B. Otherwise, if the current network's zone cannot yet be determined, the given UE assumes that the network is a potential blue or a red zone network and determines whether the current network complies with a minimum WCDMA release, 515C. For example, if the current network does not comply with the minimum UMTS WCDMA release of high-speed packet access (HSPA), then the current network has an older version of the physical layer, such that the multimedia application may infer that the visited network is a GSM or an EDGE network, and will classify the roaming network as a red zone network. If the current network does not comply with the minimum WCDMA release, the current network will essentially be treated as a red zone network and the given UE will assume the current network will not be able to support the enhanced features of the multimedia application. As such, if the current network does not comply with the minimum WCDMA release in 515C, the process advances to 515B of FIG. 5B.

Otherwise, if the current network complies with the minimum WCDMA release, the given UE attempts registration with the application server 170, 520C, and determines whether the registration attempt is successful in 525C. If the registration attempt is not successful, the given UE executes a registration failure fallback mechanism, 530C. In case of a fall back mechanism, the UE has a registration reliability schedule based on which the UE repeats the registration process after a pre-defined interval to allow the network or the application servers to recover from any errors. This process can be similar to a session initiation protocol (SIP) registration reliability schedule. Alternatively, the application server 170 can configure a default application server's IP address associated with reduced or minimal service for the multimedia application to try to get service in case the regular or full-service application servers are unavailable. On the other hand, if the registration attempt is not successful and there is no fall back mechanism or the registration fall back mechanism fails, the UE determines that the network falls in a red zone, in which case the process can advance to 515B of FIG. 5B.

Otherwise, if the registration attempt is successful, the process advances to 540B of FIG. 5B and the current network will be treated as a blue zone network. While not shown in FIG. 5C, if the given UE is able to confirm that the current network is a blue zone network in 505C or 510C, then 515C through 530C can be omitted and the process can advance directly to 540B of FIG. 5B for the blue zone network.

Figure 5D:
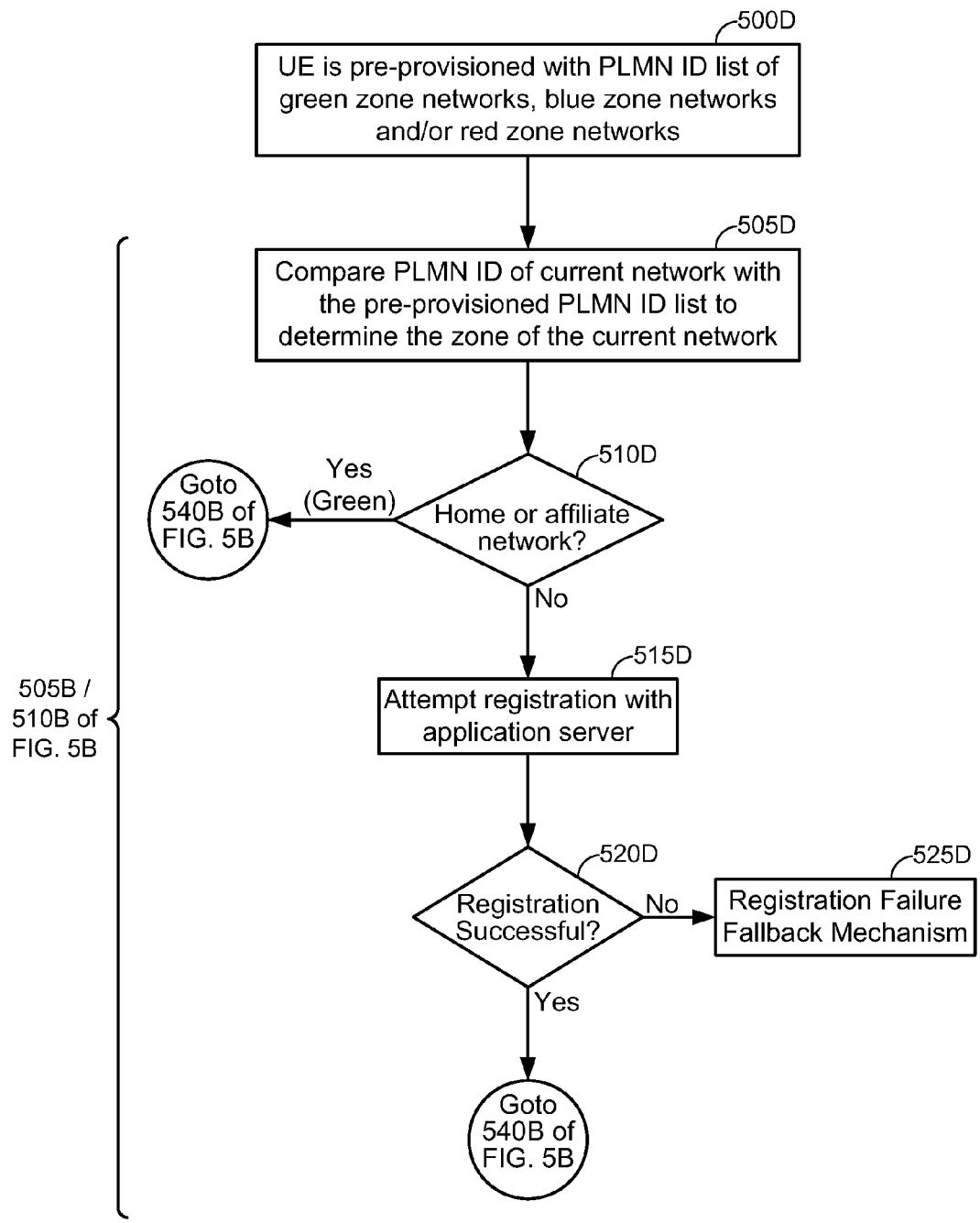
FIG. 5D illustrates an alternative process by which the given UE can determine whether its new network corresponds to a green zone network or a blue zone network in accordance with an embodiment of the invention.

FIG. 5D illustrates an alternative process by which the given UE can determine whether its new network corresponds to a green zone network or a blue zone network in accordance with an embodiment of the invention. Thus, FIG. 5C in part shows an example implementation of blocks 505B and 510B of FIG. 5B. In the example of FIG. 5D, a number of assumptions are made, as follows:

i. Only Affiliate networks are provisioned in the PLMN ID list. All other networks will be considered as blue zone networks by the multimedia application (i.e., the multimedia application will 'attempt' to obtain service from the application server 170 once registration becomes successful);
ii. A fallback mechanism is available to the multimedia application in case of registration failure;
iii. In the green zone, Home network is detected without provisioning (using IMSI & PLMN ID), dual PDP operation with QoS; and
iv. In the blue zone, there is single PDP operation with a best effort (BE) protocol fallback in case no QoS is available, the UE requests the application server to assist in getting dedicated resources using dummy packets, a conservative reliability schedule for application timers is requested and a longer de jitter buffer is used, a fallback mechanism is available to the multimedia application in case of registration failure.

Referring to FIG. 5D, assume that the given UE is pre-provisioned with a PLMN ID list of green zone networks, blue zone networks and/or red zone networks, 500D as in 500C. In an example, the pre-provisioning of 500D can occur at some point before the process of FIG. 5B is initiated. The remainder of FIG. 5D corresponds to an example implementation of blocks 505B and 510B of FIG. 5B.

Accordingly, in 505D, the given UE compares the PLMN ID of its current network with the PLMN ID list to determine whether its current network is a home network or affiliate network. In 510D, if the current network's zone is a home or affiliate network (i.e., in the green zone 500A), the process advances to 540B of FIG. 5B. Otherwise, in 510D, if the current network's zone is not a home or affiliate network, the given UE attempts registration with the application server 170, 515D, and determines whether the registration attempt is successful in 520D. If the registration attempt is successful, the process advances to 540B of FIG. 5B for the blue zone network. Otherwise, if the registration attempt is not successful, the given UE executes a registration failure fallback mechanism, 525D. In case of a fall back mechanism, the UE has a registration reliability schedule based on which it repeats the registration process after a pre-defined interval to allow the network or the application servers to recover from any errors. This process can be similar to a SIP registration reliability schedule. Alternatively, the application server 170 can configure a default application server's IP address associated with reduced or minimal service for the multimedia application to try to get service in case the regular or full-service application servers are unavailable. On the other hand, if the registration attempt is not successful and there is no fall back mechanism or the registration fall back mechanism fails, the UE determines that the network falls in a red zone, which case the process can advance to 515B of FIG. 5B.

In FIGS. 5A through 5D, the given UE is described as self-determining its current network zone. For example, in 505B and 510B of FIG. 5B, the given UE determines whether the new network corresponds to a red zone, green zone or blue zone, with similar determinations also performed at the given UE in FIGS. 5C and 5D. However, in another embodiment of the invention, the network zone-determination need not be performed at the given UE but rather can be outsourced or offloaded to the application server 170, as will be described below with respect to FIG. 5E.

Figure 5E:
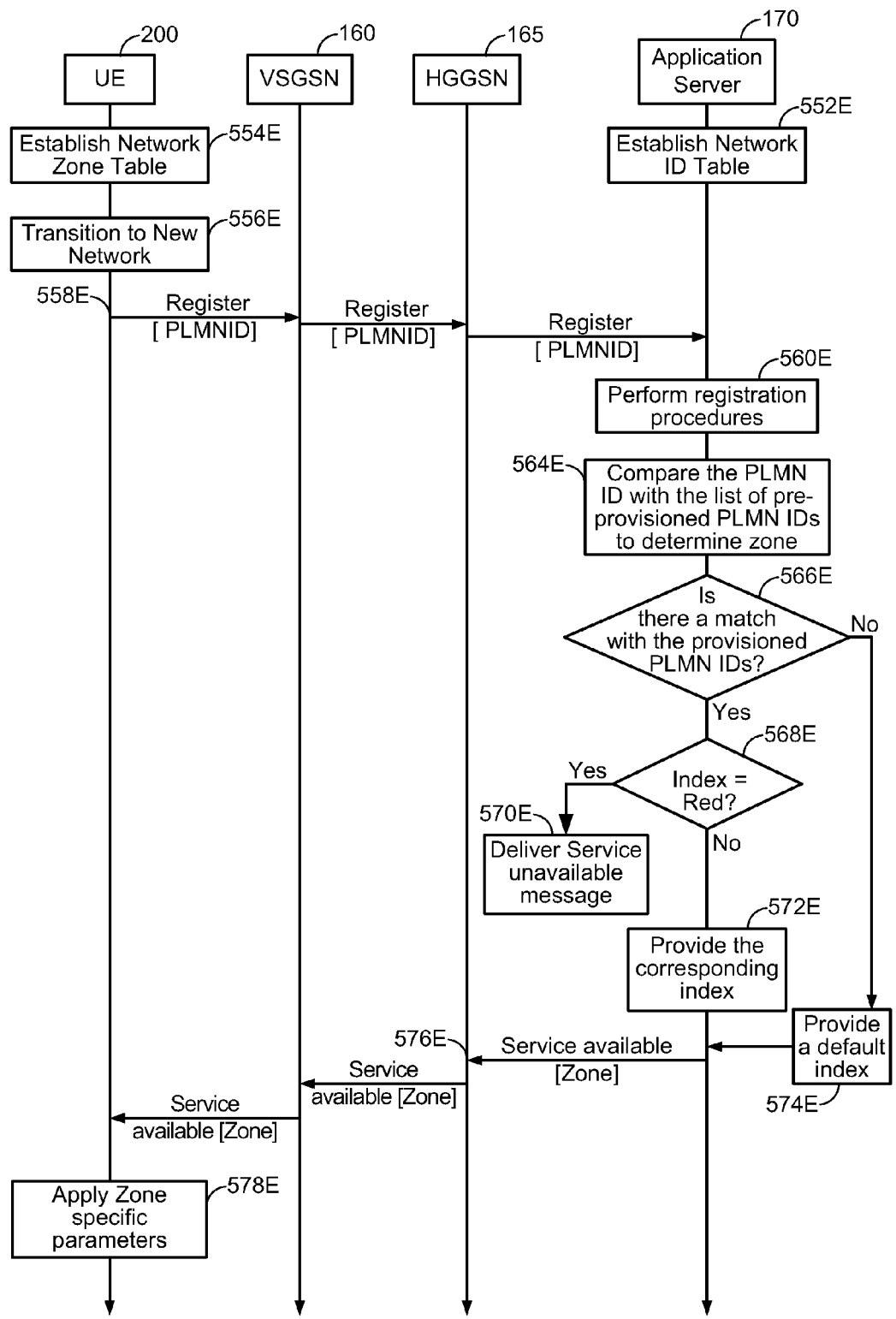
FIG. 5E illustrates an alternative process whereby network-zone detection is performed at an application sever in accordance with an embodiment of the invention.

FIG. 5E illustrates an alternative process where the zone detection is performed by the application server 170 in accordance with an embodiment of the invention. In particular, FIG. 5E is directed to an example implementation whereby the given UE reports a network identifier of its current network to the application server 170, and the application server 170 uses the reported network identifier to determine the network zone of the given UE and then execute zone-specific parameters and/or features.

Referring to FIG. 5E, assume that the application server 170 is pre-configured with a table that includes list of network IDs (e.g., PLMN IDs) that are indexed in association zones (e.g., red zones, green zones and/or blue zones) and/or zone-specific parameters or features, 552E. Table 1 (below) is illustrative of an example of the network ID table that may be provisioned at the application server 170, in an example. As shown in Table 1, Networks #1, #2 and #3 are associated with a green zone, a blue zone and a red zone, respectively, and Network #4 is associate with a "default" zone, which may be configured to be interpreted as a green zone, a blue zone or a red zone, depending on the implementation.

TABLE 1

| Network ID | Zone |
|---|---|
| Network #1 | Green |
| Network #2 | Blue |
| Network #3 | Red |
| Network #4 | Default |

Referring to FIG. 5E, the multimedia application on the UE 200 is provisioned with a table, 554E, that includes list of network zone-types that are indexed to a set of zone-specific parameters (e.g., buffer parameters such as the jitter buffer size, a vocoder type, QoS parameters, etc.). Table 2 (below) is illustrative of an example of the network zone table that may be provisioned at the given UE or UE 200, in an example. As shown in Table 1, parameters associate with green zones and blue zones are listed, although it will also be appreciated that parameters may also be stored in association with (or indexed to) "default" zones and/or red zones in other embodiments of the invention.

TABLE 2

| Green Zone | Blue Zone |
|---|---|
| Timer Parameters (Green) | Timer Parameter (Blue) |
| Buffer Parameters (Green) | Buffer Parameters (Blue) |
| QoS Parameters (Green) | QoS Parameters (Blue) |

Referring to FIG. 5E, the given UE determines that it has transitioned to a new network, 556E, with an acceptable air interface release and the requisite timing information for authentication. For example, the determination of 556E can occur when the given UE powers up, or alternatively when the given UE hands off to the new network. After detecting the network transition in 556E, the given UE sends a registration message, including a network identifier of the new network (e.g., a PLMN ID, etc.), to the application server 170 to register for the multimedia service (e.g. PTT, VoIP), 558E.

The application server 170 registers the given UE to the multimedia server, 560E, and also checks compares the network ID contained in the registration message with the network ID table from 552E, 564E, in order to determine whether the network ID table contains a matching network ID, 566E. If the application server 170 does not find a matching network ID listed in the network ID table in 566E, the process advances to 574E whereby parameters associated with a default network zone are loaded by the application server 170 (e.g., the default zone parameters may correspond to blue zone parameters, etc.). Otherwise, if the application server 170 finds a matching network ID listed in the network ID table, the process advances to 568E whereby the application server 170 determines whether the matching network ID is indicative of a red zone.

Referring to FIG. 5E at 568E, if the matching network ID is indicative of a red zone, the application server 170 notifies the given UE that the multimedia service is unavailable, 570E. While not shown explicitly in FIG. 5E, upon the receipt of the service unavailable message, the given UE may notify a user interface (UI) of the service unavailability and disable the multimedia service until another network change is detected. While this particular embodiment is configured to deny service in red zones, it will be appreciated that other embodiments (not shown in FIG. 5E) can be configured to provide limited or best-effort service levels in red zones. Otherwise, in 568E, if the matching network ID is not indicative of a red zone (e.g., a green or blue zone), the application server 170 loads the zone-specific parameters and/or features associated with the matching network ID within the network ID table, 572E, and then notifies the given UE that the multimedia service is available and also indicates the associated zone and/or zone parameters to be used for supporting the multimedia service, 576E. Upon receipt of the service availability message in 576E, the multimedia client on the given UE checks the zone indicated by the service availability message of 576E and then loads parameters corresponding to the current network zone in 578E.

Figure 6:
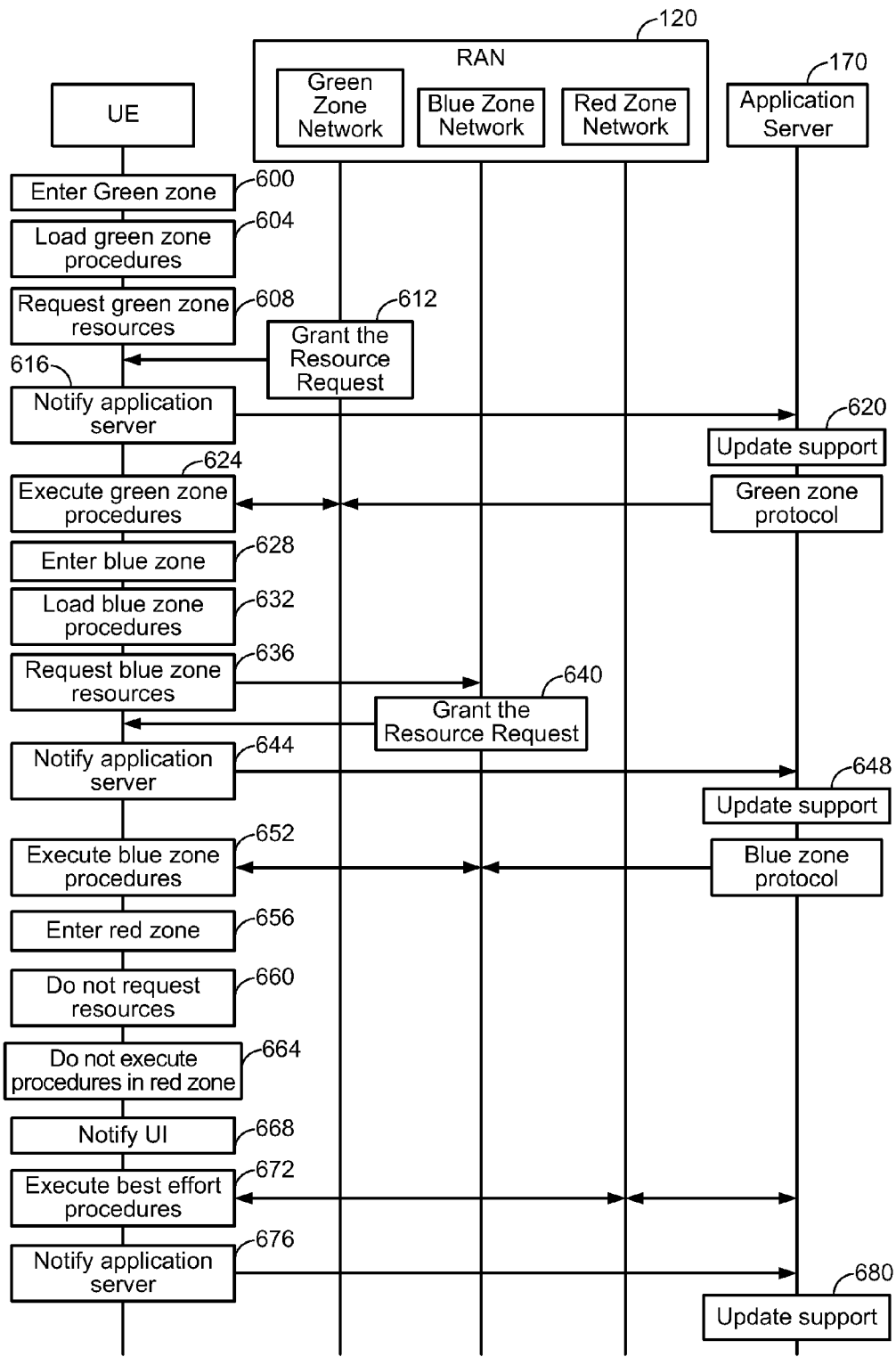
FIG. 6 illustrates a process of supporting a multimedia application of a given UE as the given UE transitions between green, blue and/or red zones in accordance with an embodiment of the invention.

FIG. 6 illustrates a process of supporting a multimedia application of a given UE as the given UE transitions between green, blue and/or red zones in accordance with an embodiment of the invention.

Referring to FIG. 6, in 600, the given UE determines that a connection or transition to a green zone network has occurred. For example, 600 of FIG. 6 can correspond to blocks 500B through 510B of FIG. 5B. Accordingly, the given UE determines a set of green zone specific network procedures for supporting the multimedia application, 604 (e.g., as in 540B of FIG. 5B). The given UE requests a green zone-specific level of resources for the multimedia application in the green zone network, 608 (e.g., as in 545B of FIG. 5B), and the green zone network grants the resource request, 612.

The given UE can notify the application server 170 that the given UE is in a green zone network, 616 (e.g., as in 548B of FIG. 5B). In response to the notification of 616, the application server 170 can selectively update the manner in which communication sessions for the given UE are supported and/or arbitrated, 620. In this case, because the application server 170 is notified that the given UE is in the green zone 500A, the application server 170 may support the given UE in a 'normal' or full-featured manner.

The given UE and the application server 170 execute the set of green zone-specific network procedures and also, if necessary, support communication sessions using the allocated resource via the multimedia application, 624. For example, the network procedures executed in 624 can include sending keep-alive packets at a frequency specific to green zone networks. In an example, the green zone-specific network procedures can correspond to the multimedia application operating in a single or dual PDP mode with full QoS, access to any enhanced features available from the application server 170. In another example, an affiliate network of the green zone 500A can provide similar, but slightly different parameters as compared to a home network of the green zone 500A.

Referring to FIG. 6, in 628, the given UE determines a transition to a blue zone network has occurred, that the blue zone network complies with a minimum WCDMA release and the given UE successfully registers with the application server 170 from the blue zone network. For example, 628 of FIG. 6 can correspond to blocks 500B through 510B of FIG. 5B, 505C through 525C of FIG. 5C and/or 505D through 520D of FIG. 5D. Accordingly, the given UE determines a set of blue zone specific network procedures for supporting the multimedia application, 632 (e.g., as in 540B of FIG. 5B). The given UE requests a blue zone-specific level of resources for the multimedia application in the blue zone network, 636 (e.g., as in 545B of FIG. 5B), and the blue zone network grants the resource request, 640. In this case, the resource request that is granted at 640 requests fewer resources than the resource request of 608 based on the given UE's recognition of resource availability in blue zones as compared to green zones, such as a partial rejection of resources as in 420D of FIG. 4D can be avoided.

The given UE can notify the application server 170 that the given UE is in a green zone network, 644 (e.g., as in 548B of FIG. 5B). In response to the notification of 644, the application server 170 can selectively update the manner in which communication sessions for the given UE are supported and/or arbitrated, 648. In this case, because the application server 170 is notified that the given UE is in the blue zone 505A, the application server 170 may support the given UE in a 'reduced' or partial-featured manner.

The given UE and the application server 170 execute the set of blue zone-specific network procedures and also, if necessary, support communication sessions using the allocated resource via the multimedia application, 652. For example, the network procedures executed in 652 can include sending keep-alive packets at a frequency specific to blue zone networks. In an example, the blue zone-specific network procedures can correspond to the multimedia application operating in a single PDP mode either with QoS or with a best effort (BE) fallback mechanism (i.e., sessions are supported in the absence of QoS, if necessary), timing information is available, a fallback mechanism in case of registration failure is available (e.g., as in 530C of FIG. 5C and/or 525D of FIG. 5D) and higher-latency service is permitted as compared to the green zone-specific network procedures.

In an example, the blue zone-specific network procedures can include a disruptive tolerant mechanism. The multimedia application can use a different set of reliability and keep alive mechanisms to provide a reliable service and better user experience while managing the battery life efficiently, as compared to the green zone-specific network procedures. Accordingly, the blue zone-specific network procedures can attempt to provide reliable service at the expense of performance.

Referring to FIG. 6, in 656, the given UE determines a transition to a red zone network has occurred. For example, 656 of FIG. 6 can correspond to blocks 500B through 510B of FIG. 5B. Accordingly, the given UE refrains from requesting resources associated with enhanced feature-support of the multimedia application because the given UE assumes that any such request would be rejected by the red zone network, 660 (e.g., as in 515B of FIG. 5B). Likewise, the given UE refrains from executing network procedures (e.g., such as green zone or blue zone network procedures) for supporting the multimedia application in the red zone network based on the red zone recognition of the current serving network of the given UE, 664 (e.g., as in 520B of FIG. 5B). The given UE notifies its user with regard to the reduced-support of the multimedia application within the red zone network, 668 (e.g., as in 525B of FIG. 5B).

Next, the given UE optionally supports the multimedia application via best-effort protocols in the absence of a resource-allocation for the enhanced support features of the multimedia application, such as QoS, 672 (e.g., as in 530B of FIG. 5B). Also, the given UE can optionally notify the application server 170 that the given UE is in a red zone network, 676 (e.g., as in 535B of FIG. 5B). Assuming that the given UE notifies the application server 170 in 676, the application server 170 can selectively update the manner in which communication sessions for the given UE are supported and/or arbitrated, 680. In this case, because the application server 170 is notified that the given UE is in the red zone 510A, the application server 170 may support the given UE in a 'reduced' or null-featured manner (e.g., further reduced from the support-level of blue zone network-connected UEs as in 652).

While FIG. 6 illustrates transitions of the given UE from the green zone to the blue zone and then to the red zone, it will be readily appreciated how the process of FIG. 6 can carry over to green-to-red transitions, to blue-to-green transitions and/or to red-to-green transitions in other embodiments of the invention.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., access terminal). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of operating a user equipment (UE) within a wireless communications system, comprising:
    determining that a current serving network of the UE is associated with a network support zone of a given type, wherein network support zones of different types are characterized by different levels of support for a multimedia client application configured to manage server-arbitrated communication sessions at the UE, wherein the different types of network support zones include two or more types that permit the multimedia client application to actively engage in the server-arbitrated communication sessions at different levels of support;
    loading, based on the determination, a set of zone-specific network procedures and/or features for supporting the multimedia client application within the network support zone of the given type; and
    executing the set of zone-specific network procedures and/or using the set of zone-specific network features at the UE while connected to the current serving network,
    wherein the determining step identifies the given type of the current serving network as corresponding to a first type being a home and/or affiliate network of the UE configured to provide a full level or high level of support for the multimedia client application, a second type being a roaming network of the UE configured to provide an intermediate level of support for the multimedia client application or a third type being a roaming network of the UE configured to provide zero-support or low support for the multimedia client application,
    wherein the first, second and third types are associated with different zone-specific network procedures and/or features and the UE is provisioned with the zone-specific network procedures and/or features at least for the given type, and
    wherein the loading step loads the provisioned zone-specific network procedures and/or features for the given type as the set of zone-specific network procedures and/or features.

2. The method of claim 1, wherein the network support zones of the first type and/or the second type are configured to provide a threshold Quality of Service (QoS), timing information used by the multimedia client application for timestamp-based authentication credential generation and/or a set of always-on packet data protocol (PDP) contexts.

3. The method of claim 1, wherein the network support zone of the given type corresponds to the network support zone of the first type.

4. The method of claim 3, wherein executing the set of zone-specific network procedures at the UE includes (i) requesting a given set of resources that is fully or partially unavailable in the network support zones of the second or third types from the current serving network of the UE and/or an application server configured to arbitrate the server-arbitrated communication sessions for the UE, (ii) notifying the application server that the UE is operating within the network support zone of the first type, (iii) sending keep-alive packets at a frequency associated with the network support zone of the first type, and/or (iv) operating in dual packet data protocol (PDP) with Quality of Service (QoS).

5. The method of claim 1, wherein the network support zone of the given type corresponds to the network support zone of the third type.

6. The method of claim 5, wherein executing the set of zone-specific network procedures at the UE includes (i) refraining from requesting a given set of resources that is fully or partially available in the network support zones of the second or third types from the current serving network of the UE and/or an application server configured to arbitrate the server-arbitrated communication sessions for the UE, (ii) notifying a user of the UE that the UE is operating within the network support zone of the third type, and/or (iii) notifying the application server that the UE is operating within the network support zone of the third type.

7. The method of claim 5, wherein executing the set of zone-specific network procedures at the UE includes attempting to support the multimedia client application in the network support zone of the third type using best-effort protocols without Quality of Service (QoS).

8. The method of claim 1, wherein the network support zone of the given type corresponds to the network support zone of the second type.

9. The method of claim 8, wherein executing the set of zone-specific network procedures at the UE includes (i) requesting a subset of a given set of resources that is available in the network support zone of the first type from the current serving network of the UE and/or an application server configured to arbitrate the server-arbitrated communication sessions for the UE, (ii) notifying the application server that the UE is operating within the network support zone of the second type, (iii) sending keep-alive packets at a frequency associated with the network support zone of the second type, and/or (iv) operating in single packet data protocol (PDP) with Quality of Service (QoS).

10. The method of claim 8, wherein executing the set of zone-specific network procedures at the UE includes attempting to support the multimedia client application in the network support zone of the second type using best-effort protocols without Quality of Service (QoS).

11. The method of claim 1, further comprising:
determining that the UE has transitioned to a serving network associated with a network support zone of another one of the first, second and third types that is different than the given type;
loading another set of zone-specific network procedures and/or features for supporting the multimedia client application within the network support zone of the another type; and executing the another set of zone-specific network procedures and/or using the another set of zone-specific network features at the UE.

12. The method of claim 1, wherein the UE is provisioned with a network identifier database that includes a list of network identifiers that identify networks within the wireless communications system, with each listed network identifier mapped to a particular type of network support zone.

13. The method of claim 12, wherein the determining step includes:
determining a given network identifier of the current serving network,
determining a listed network identifier within the network identifier database that matches the given network identifier, and
establishing the network support zone of the given type as the particular type of network support zone to which the matching network identifier is mapped.

14. The method of claim 12, wherein the determining step includes:
determining a given network identifier of the current serving network,
determining that the given network identifier does not match any listed network identifiers within the network identifier database, and
establishing the network support zone of the given type as a default type of network support zone based on the no-match determination.

15. The method of claim 12, wherein the determining step includes:
determining a given network identifier of the current serving network,
determining that the given network identifier does not match any listed network identifiers within the network identifier database,
attempting to register, from the current serving network, with an application server configured to arbitrate the server-arbitrated communication sessions for the UE,
selecting between the first, second and third types based on whether the attempt to register with the application server is successful, and
establishing the network support zone of the given type as the selected type of network support zone.

16. The method of claim 15, further comprising:
determining that the attempt to register with the application server fails; and
executing a registration failure fallback mechanism protocol based on the registration-failure determination.

17. The method of claim 16, wherein the registration failure fallback mechanism protocol includes:
repeatedly attempting to register with the application server from the current serving network at a given interval until a successful registration is achieved.

18. The method of claim 12, wherein the determining step includes:
determining a given network identifier of the current serving network,
determining that the given network identifier does not match any listed network identifiers within the network identifier database that are associated with the home network and/or the affiliate network of the UE, and
attempting to register, from the current serving network, with an application server configured to arbitrate the server-arbitrated communication sessions for the UE.

19. The method of claim 18, wherein the determining that the current serving network of the UE is associated with the network support zone of the given type step further includes:

if the attempt to register with the application server is determined to be successful, establishing the network support zone of the given type as the first type; and if the attempt to register with the application server is determined not to fail, executing a registration failure fallback mechanism protocol based on the registration-failure determination.

20. The method of claim 19, wherein the registration failure fallback mechanism protocol includes:

repeatedly attempting to register with the application server from the current serving network at a given interval until a successful registration is achieved.

21. The method of claim 12, wherein the listed network identifiers correspond to public land mobile network (PLMN) identifiers.

22. A method of operating an application server that is configured to arbitrate communication sessions for a user equipment (UE) within a wireless communications system, comprising:

determining that a current serving network of the UE is associated with a network support zone of a given type, wherein network support zones of different types are characterized by different levels of support for a multimedia client application configured to manage the UE's communication sessions with the application server;

selecting a set of zone-specific network parameters and/or features based on the determination; and interacting with the multimedia client application within the network support zone of the given type with the set of zone-specific network parameters and/or features, wherein the determining step identifies the given type of the current serving network as corresponding to a first type being a home and/or affiliate network of the UE configured to provide a full level or high level of support for the multimedia client application, a second type being a roaming network of the UE configured to provide an intermediate level of support for the multimedia client application or a third type being a roaming network of the UE configured to provide zero-support or low support for the multimedia client application, wherein the first, second and third types are associated with different zone-specific network parameters and/or features and the application server is provisioned with the zone-specific network parameters and/or features at least for the given type, and wherein the selecting step selects the provisioned zone-specific network parameters and/or features associated with the given type as the set of zone-specific network parameters and/or features.

23. The method of claim 22, wherein the determining step includes:

receiving a report from the UE that includes a network identifier of the current serving network of the UE;

comparing the reported network identifier to a network identifier table that stores a plurality of network identifiers, at least one of the plurality of network identifiers stored in association with the network support zone of the given type; and determining the current serving network to be associated with the network support zone of the given type based on the comparison.

24. The method of claim 23, wherein the comparison identifies a network identifier from among the plurality of network identifiers that matches the reported network identifier, and wherein the network support zone of the given type is determined to correspond to the given type of network support zone that is stored in association with the matching network identifier.

25. The method of claim 23, wherein the comparison does not identify a network identifier from among the plurality of network identifiers that matches the reported network identifier, and wherein the network support zone of the given type is determined to correspond to a default type of network support zone.

26. The method of claim 22, wherein the set of zone-specific network parameters and/or the features corresponds to parameters and/or features that are expected to be supported within the network support zone of the given type.

27. The method of claim 22, wherein the set of zone-specific network parameters and/or features includes one or more of (i) a push-to-talk (PTT) feature, (ii) a Voice over Internet Protocol (VoIP) feature, (iii), a set of always-on packet data protocol (PDP) contexts, (iv) a threshold level of Quality of Service (QoS) and/or (v) timing information used by the multimedia client application for timestamp-based authentication credential generation.

28. The method of claim 22, wherein the network support zone of the given type corresponds to the first type or the second type, and wherein the interacting step includes notifying the UE that the multimedia client application is supported in the current serving network including an indication of the level of support for the multimedia client application and then supporting the multimedia client application in accordance with the indicated level of support.

29. The method of claim 22, wherein the network support zone of the given type corresponds to the third type, wherein the interacting step includes notifying the UE that the multimedia client application is unsupported in the current serving network, and wherein the set of zone-specific network parameters and/or features corresponds to a denial of service.

30. A user equipment (UE) within a wireless communication system, comprising:

means for determining that a current serving network of the UE is associated with a network support zone of a given type, wherein network support zones of different types are characterized by different levels of support for a multimedia client application configured to manage server-arbitrated communication sessions at the UE, wherein the different types of network support zones include two or more types that permit the multimedia client application to actively engage in the server-arbitrated communication sessions at different levels of support;

means for loading, based on the determination, a set of zone-specific network procedures and/or features for supporting the multimedia client application within the network support zone of the given type; and means for executing the set of zone-specific network procedures and/or using the set of zone-specific network features at the UE while connected to the current serving network, wherein the means for determining identifies the given type of the current serving network as corresponding to a first type being a home and/or affiliate network of the UE configured to provide a full level or high level of support for the multimedia client application, a second type being a roaming network of the UE configured to provide an intermediate level of support for the multimedia client application or a third type being a roaming network of the UE configured to provide zero-support or low support for the multimedia client application, wherein the first, second and third types are associated with different zone-specific network procedures and/or features and the UE is provisioned with the zone-specific network procedures and/or features at least for the given type, and wherein the means for loading loads the provisioned zone-specific network procedures and/or features for the given type as the set of zone-specific network procedures and/or features.

31. An application server that is configured to arbitrate communication sessions for a user equipment (UE) within a wireless communications system, comprising:

means for determining that a current serving network of the UE is associated with a network support zone of a given type, wherein network support zones of different types are characterized by different levels of support for a multimedia client application configured to manage the UE's communication sessions with the application server;

means for selecting a set of zone-specific network parameters and/or features based on the determination; and means for interacting with the multimedia client application within the network support zone of the given type with the selected set of zone-specific network parameters and/or features, wherein the means for determining identifies the given type of the current serving network as corresponding to a first type being a home and/or affiliate network of the UE configured to provide a full level or high level of support for the multimedia client application, a second type being a roaming network of the UE configured to provide an intermediate level of support for the multimedia client application or a third type being a roaming network of the UE configured to provide zero-support or low support for the multimedia client application, wherein the first, second and third types are associated with different zone-specific network parameters and/or features and the application server is provisioned with the zone-specific network parameters and/or features at least for the given type, and wherein the means for selecting selects the provisioned zone-specific network parameters and/or features associated with the given type as the set of zone-specific network parameters and/or features.

32. A user equipment (UE) within a wireless communications system, comprising:

logic configured to determine that a current serving network of the UE is associated with a network support zone of a given type, wherein network support zones of different types are characterized by different levels of support for a multimedia client application configured to manage server-arbitrated communication sessions at the UE, wherein the different types of network support zones include two or more types that permit the multimedia client application to actively engage in the server-arbitrated communication sessions at different levels of support;

logic configured to load, based on the determination, a set of zone-specific network procedures and/or features for supporting the multimedia client application within the network support zone of the given type; and logic configured to execute the set of zone-specific network procedures and/or using the set of zone-specific network features at the UE while connected to the current serving network, wherein the logic configured to determine identifies the given type of the current serving network as corresponding to a first type being a home and/or affiliate network of the UE configured to provide a full level or high level of support for the multimedia client application, a second type being a roaming network of the UE configured to provide an intermediate level of support for the multimedia client application or a third type being a roaming network of the UE configured to provide zero-support or low support for the multimedia client application, wherein the first, second and third types are associated with different zone-specific network procedures and/or features and the UE is provisioned with the zone-specific network procedures and/or features at least for the given type, and wherein the logic configured to load loads the provisioned zone-specific network procedures and/or features for the given type as the set of zone-specific network procedures and/or features.

33. An application server that is configured to arbitrate communication sessions for a user equipment (UE) within a wireless communications system, comprising:

logic configured to determine that a current serving network of the UE is associated with a network support zone of a given type, wherein network support zones of different types are characterized by different levels of support for a multimedia client application configured to manage the UE's communication sessions with the application server;

logic configured to select a set of zone specific network parameters and/or features based on the determination; and logic configured to interact with the multimedia client application within the network support zone of the given type with the selected set of zone-specific network parameters and/or features, wherein the logic configured to determine identifies the given type of the current serving network as corresponding to a first type being a home and/or affiliate network of the UE configured to provide a full level or high level of support for the multimedia client application, a second type being a roaming network of the UE configured to provide an intermediate level of support for the multimedia client application or a third type being a roaming network of the UE configured to provide zero-support or low support for the multimedia client application, wherein the first, second and third types are associated with different zone-specific network parameters and/or features and the application server is provisioned with the zone-specific network procedures and/or features at least for the given type, and wherein the logic configured to select selects the provisioned zone-specific network parameters and/or features associated with the given type as the set of zone-specific network procedures and/or features.

34. A non-transitory computer-readable storage medium containing instructions stored thereon, which, when executed by a user equipment (UE) within a wireless communications system, cause the UE to perform operations, the instructions comprising:

program code to determine that a current serving network of the UE is associated with a network support zone of a given type, wherein network support zones of different types are characterized by different levels of support for a multimedia client application configured to manage server-arbitrated communication sessions at the UE, wherein the different types of network support zones include two or more types that permit the multimedia client application to actively engage in the server-arbitrated communication sessions at different levels of support;
program code to load, based on the determination, a set of zone-specific network procedures and/or features for supporting the multimedia client application within the network support zone of the given type; and
program code to execute the set of zone-specific network procedures and/or using the set of zone-specific network features at the UE while connected to the current serving network,
wherein the program code to determine identifies the given type of the current serving network as corresponding to a first type being a home and/or affiliate network of the UE configured to provide a full level or high level of support for the multimedia client application, a second type being a roaming network of the UE configured to provide an intermediate level of support for the multimedia client application or a third type being a roaming network of the UE configured to provide zero-support or low support for the multimedia client application,
wherein the first, second and third types are associated with different zone-specific network procedures and/or features and the UE is provisioned with the zone-specific network procedures and/or features at least for the given type, and
wherein the program code to load loads the provisioned zone-specific network procedures and/or features for the given type as the set of zone-specific network procedures and/or features.

35. A non-transitory computer-readable storage medium containing instructions stored thereon, when executed by an application server that is configured to arbitrate communication sessions for a user equipment (UE) within a wireless communications system, cause that application server to perform operations, the instructions comprising:
program code to determine that a current serving network of the UE is associated with a network support zone of a given type, wherein network support zones of different types are characterized by different levels of support for a multimedia client application configured to manage the UE's communication sessions with the application server;
program code to select a set of zone-specific network parameters and/or features based on the determination; and
program code to interact with the multimedia client application within the network support zone of the given type with the selected set of zone-specific network parameters and/or features,
wherein the program code to determine identifies the given type of the current serving network as corresponding to a first type being a home and/or affiliate network of the UE configured to provide a full level or high level of support for the multimedia client application, a second type being a roaming network of the UE configured to provide an intermediate level of support for the multimedia client application or a third type being a roaming network of the UE configured to provide zero-support or low support for the multimedia client application,
wherein the first, second and third types are associated with different zone-specific network parameters and/or features and the application server is provisioned with the zone-specific network parameters and/or features at least for the given type, and
wherein the program code to select selects the provisioned zone-specific network parameters and/or features associated with the given type as the set of zone-specific network parameters and/or features.

* * * * *